US012687653B2

(12) United States Patent
Wlodarczyk

(10) Patent No.: US 12,687,653 B2
(45) Date of Patent: Jul. 21, 2026

(54) WELLBORE DATA DEPTH MATCHING USING CHANGE POINT ALGORITHMS

(71) Applicant: Schlumberger Technology Corporation, Sugar Land, TX (US)

(72) Inventor: Sylvain Wlodarczyk, Montpellier (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 365 days.

(21) Appl. No.: 18/552,239

(22) PCT Filed: May 27, 2021

(86) PCT No.: PCT/US2021/034537
§ 371 (c)(1),
(2) Date: Sep. 25, 2023

(87) PCT Pub. No.: WO2022/203702
PCT Pub. Date: Sep. 29, 2022

(65) Prior Publication Data
US 2024/0201408 A1 Jun. 20, 2024

Related U.S. Application Data

(60) Provisional application No. 63/200,772, filed on Mar. 26, 2021.

(51) Int. Cl.
*G01V 1/50* (2006.01)
*E21B 49/00* (2006.01)
(52) U.S. Cl.
CPC ............... *G01V 1/50* (2013.01); *E21B 49/00* (2013.01)

(58) Field of Classification Search
CPC .. G01V 1/50; G01V 1/40; E21B 7/068; E21B 49/00
See application file for complete search history.

(56) References Cited

U.S. PATENT DOCUMENTS 4,312,040 A 1/1982 Tinch
4,320,469 A 3/1982 Frawley
(Continued)

FOREIGN PATENT DOCUMENTS

CN 110852144 A 2/2020
NO 322790 B1 12/2006
(Continued)

OTHER PUBLICATIONS

Henriques, M.V.C. et al., "Improving the analysis of well-logs by wavelet cross-correlation", Physica A, 2015, 417, pp. 130-140.
(Continued)

*Primary Examiner* — Lam S Nguyen
(74) *Attorney, Agent, or Firm* — Kyle R. Miiller

(57) ABSTRACT

A method includes receiving a well log having a signal. The method also includes identifying in the signal a first change point that demarcates a first signal region and a second signal region. The method also includes determining that the first signal region is inconsistent in comparison to the second signal region. The method also includes producing a modified well log by removing the first signal region from the signal in response to determining that the first signal region is inconsistent in comparison to the second signal region.

19 Claims, 20 Drawing Sheets

(56)                    References Cited

U.S. PATENT DOCUMENTS

| 4,541,275 | A | 9/1985 | Kerzner | |
|---|---|---|---|---|
| 5,999,884 | A | 12/1999 | Kriegshauser | |
| 6,012,017 | A | 1/2000 | Van Bemmel | |
| 10,732,312 | B2 * | 8/2020 | Bartetzko | G01V 1/50 |
| 2013/0179081 | A1 * | 7/2013 | Bartetzko | G01V 11/00 |
| | | | | 702/11 |
| 2017/0343693 | A1 | 11/2017 | Walker | |
| 2018/0003032 | A1 | 1/2018 | Donzier | |
| 2020/0183042 | A1 | 6/2020 | Amidi | |
| 2021/0181370 | A1 | 6/2021 | Zimmermann | |

FOREIGN PATENT DOCUMENTS

| WO | 2017135972 | A1 | 8/2017 |
|---|---|---|---|
| WO | 2019089490 | A1 | 5/2019 |

OTHER PUBLICATIONS

Killick, et al., "Optimal Detection of Changepoints with a Linear Computational Cost", Journal of the American Statistical Association, vol. 107, No. 500, 2012, pp. 1590-1598.
AAPG Wiki, "Preprocessing of Logging Data", Retreived From https://wiki.aapg.org/Preprocessing_of_logging_data, Retrieved on Nov. 21, 2024, 6 Pages.
Anonymous, "A Brief Introduction to Change Point Detection using Python—Tech Rando", Retrieved from https://techrando.com/2019/08/14/a-brief-introduction-to-change-point-detection-using-python/, Aug. 14, 2019, 20 Pages.
Bruned et al., "Evaluation of Mineralogy per Geological Layers by Approximate Bayesian Computation", Society of Petroleum Engineers, Oct. 2020, pp. 2418-2432.
Candemir et al., "A Comparative Study on Paramete Selection and Outlier Removal for Change Point Detection in Time Series", IEEE European Conference on Electrical Engineering and Computer Science, 2017, pp. 218-224.
Mico et al., "Automatic Segmentation of Long-Term ECG Signals Corrupted with Broadband Noise based on Sample Entropy", Computer Methods and Programs in Biomedicine, Elsevier, Amsterdam, NL, vol. 98, No. 2, May 1, 2010, pp. 118-129.
Partovi, et al., "Geological Boundary Detection From Well-logs: An Efficient Approach Based on Pattern Recognition", Journal of Petroleum Science and Engineering, vol. 176, 2019, pp. 444-455.
Ruggieri, Eric, "A Pruned Recursive Solution to the Multiple Change Point Problem", Computational Statistics, vol. 33, No. 2, Aug. 3, 2017, pp. 1017-1045.
Truong et al., "Selective review of offline change point detection methods", Signal Processing, vol. 167, Feb. 2020, 8 pages.
Zhang, et al., "Dynamic Time Warping under Limited Warping Path Length", Information Sciences, vol. 393, Jul. 1, 2017, pp. 91-107.
Zimmermann, et al., "Machine-Learning-Based Automatic Well-Log Depth Matching", Journal Paper of Petrophysicists , vol. 59, No. 06, 2018, pp. 863-872.

* cited by examiner

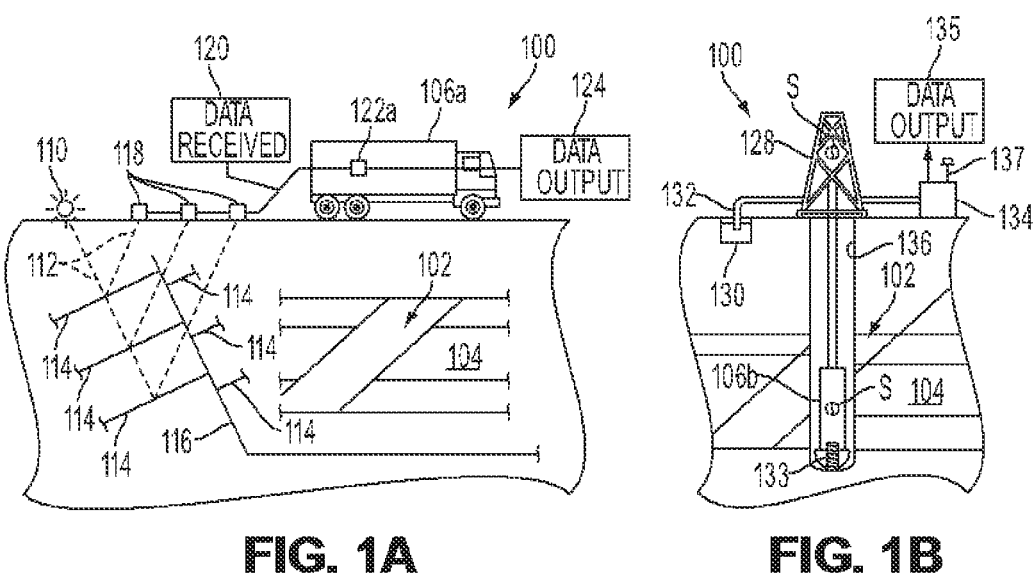
FIG. 1A          FIG. 1B
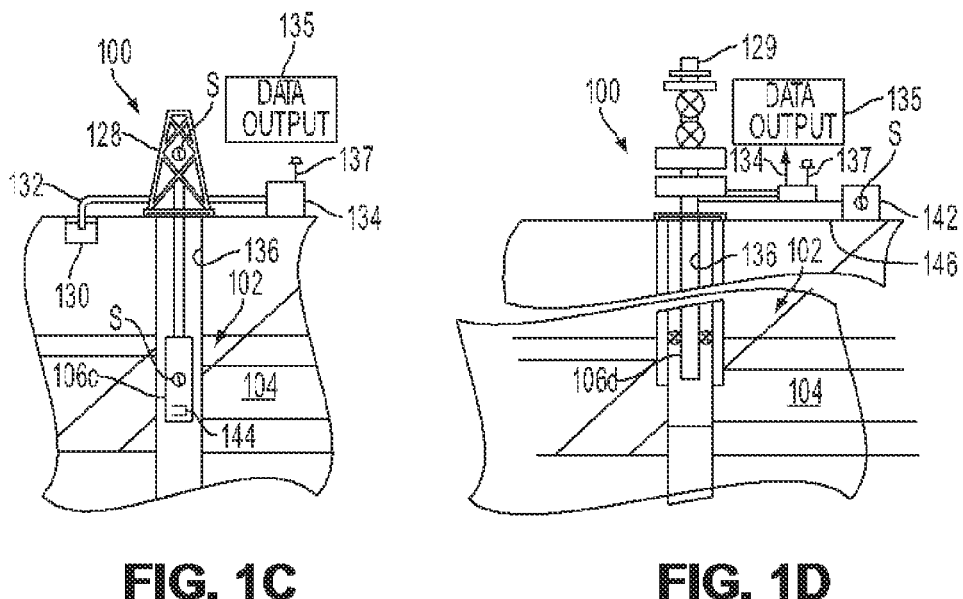
FIG. 1C          FIG. 1D

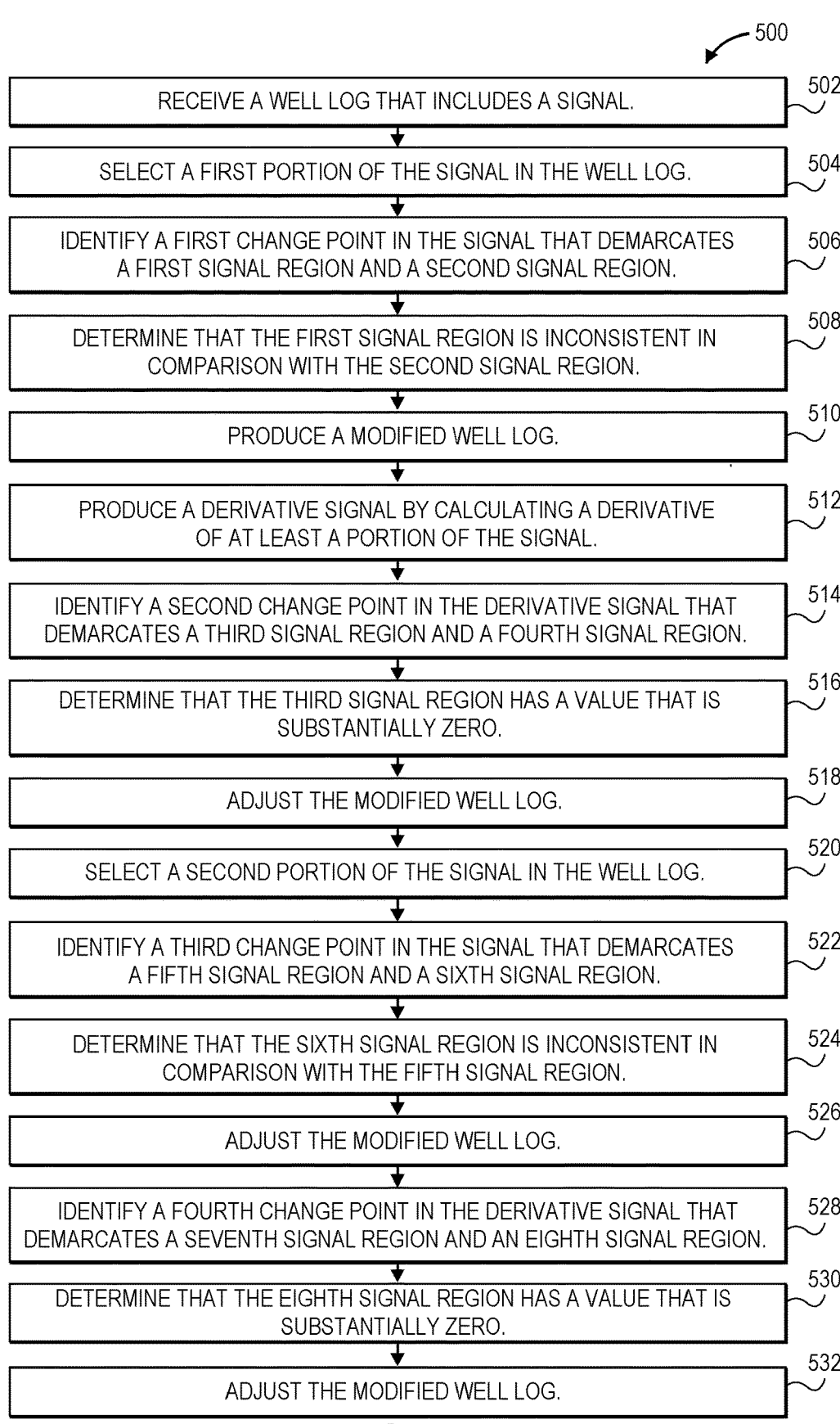

500

RECEIVE A WELL LOG THAT INCLUDES A SIGNAL.    502

SELECT A FIRST PORTION OF THE SIGNAL IN THE WELL LOG.    504

IDENTIFY A FIRST CHANGE POINT IN THE SIGNAL THAT DEMARCATES A FIRST SIGNAL REGION AND A SECOND SIGNAL REGION.    506

DETERMINE THAT THE FIRST SIGNAL REGION IS INCONSISTENT IN COMPARISON WITH THE SECOND SIGNAL REGION.    508

PRODUCE A MODIFIED WELL LOG.    510

PRODUCE A DERIVATIVE SIGNAL BY CALCULATING A DERIVATIVE OF AT LEAST A PORTION OF THE SIGNAL.    512

IDENTIFY A SECOND CHANGE POINT IN THE DERIVATIVE SIGNAL THAT DEMARCATES A THIRD SIGNAL REGION AND A FOURTH SIGNAL REGION.    514

DETERMINE THAT THE THIRD SIGNAL REGION HAS A VALUE THAT IS SUBSTANTIALLY ZERO.    516

ADJUST THE MODIFIED WELL LOG.    518

SELECT A SECOND PORTION OF THE SIGNAL IN THE WELL LOG.    520

IDENTIFY A THIRD CHANGE POINT IN THE SIGNAL THAT DEMARCATES A FIFTH SIGNAL REGION AND A SIXTH SIGNAL REGION.    522

DETERMINE THAT THE SIXTH SIGNAL REGION IS INCONSISTENT IN COMPARISON WITH THE FIFTH SIGNAL REGION.    524

ADJUST THE MODIFIED WELL LOG.    526

IDENTIFY A FOURTH CHANGE POINT IN THE DERIVATIVE SIGNAL THAT DEMARCATES A SEVENTH SIGNAL REGION AND AN EIGHTH SIGNAL REGION.    528

DETERMINE THAT THE EIGHTH SIGNAL REGION HAS A VALUE THAT IS SUBSTANTIALLY ZERO.    530

ADJUST THE MODIFIED WELL LOG.    532

FIG. 5

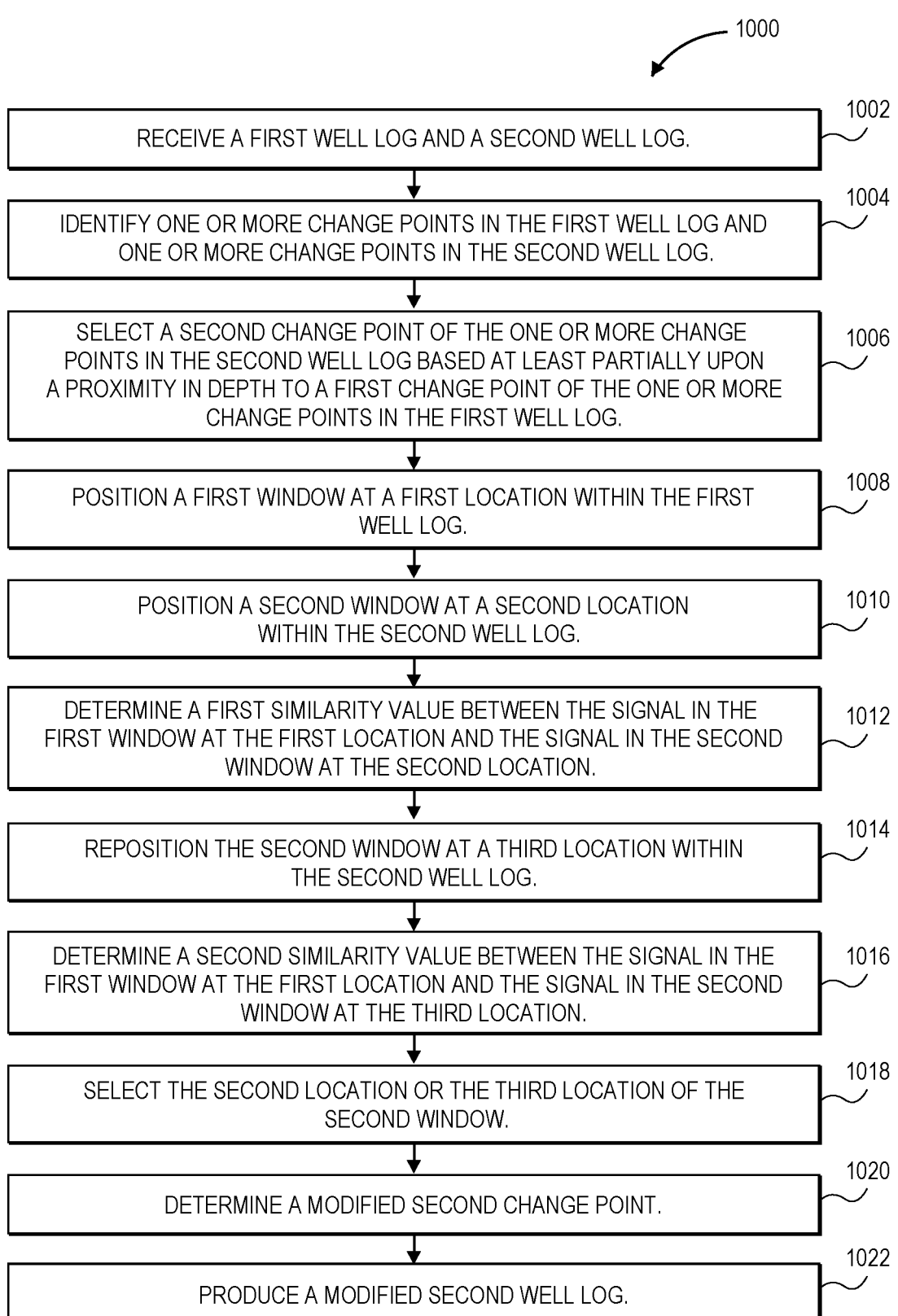

1000

RECEIVE A FIRST WELL LOG AND A SECOND WELL LOG.    1002

IDENTIFY ONE OR MORE CHANGE POINTS IN THE FIRST WELL LOG AND ONE OR MORE CHANGE POINTS IN THE SECOND WELL LOG.    1004

SELECT A SECOND CHANGE POINT OF THE ONE OR MORE CHANGE POINTS IN THE SECOND WELL LOG BASED AT LEAST PARTIALLY UPON A PROXIMITY IN DEPTH TO A FIRST CHANGE POINT OF THE ONE OR MORE CHANGE POINTS IN THE FIRST WELL LOG.    1006

POSITION A FIRST WINDOW AT A FIRST LOCATION WITHIN THE FIRST WELL LOG.    1008

POSITION A SECOND WINDOW AT A SECOND LOCATION WITHIN THE SECOND WELL LOG.    1010

DETERMINE A FIRST SIMILARITY VALUE BETWEEN THE SIGNAL IN THE FIRST WINDOW AT THE FIRST LOCATION AND THE SIGNAL IN THE SECOND WINDOW AT THE SECOND LOCATION.    1012

REPOSITION THE SECOND WINDOW AT A THIRD LOCATION WITHIN THE SECOND WELL LOG.    1014

DETERMINE A SECOND SIMILARITY VALUE BETWEEN THE SIGNAL IN THE FIRST WINDOW AT THE FIRST LOCATION AND THE SIGNAL IN THE SECOND WINDOW AT THE THIRD LOCATION.    1016

SELECT THE SECOND LOCATION OR THE THIRD LOCATION OF THE SECOND WINDOW.    1018

DETERMINE A MODIFIED SECOND CHANGE POINT.    1020

PRODUCE A MODIFIED SECOND WELL LOG.    1022

FROM 1330

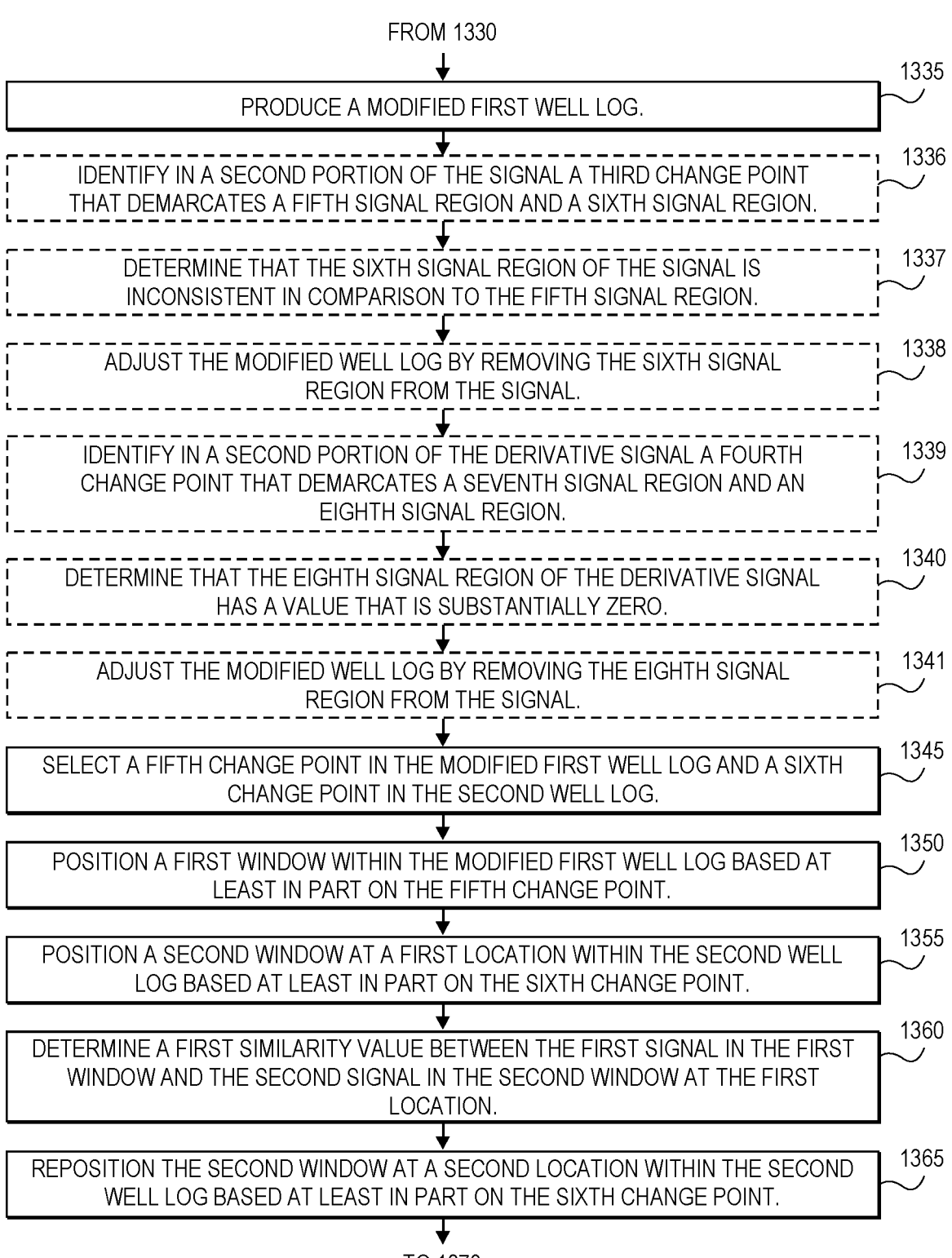

PRODUCE A MODIFIED FIRST WELL LOG.                                                    1335

IDENTIFY IN A SECOND PORTION OF THE SIGNAL A THIRD CHANGE POINT
THAT DEMARCATES A FIFTH SIGNAL REGION AND A SIXTH SIGNAL REGION.                      1336

DETERMINE THAT THE SIXTH SIGNAL REGION OF THE SIGNAL IS
INCONSISTENT IN COMPARISON TO THE FIFTH SIGNAL REGION.                                1337

ADJUST THE MODIFIED WELL LOG BY REMOVING THE SIXTH SIGNAL
REGION FROM THE SIGNAL.                                                               1338

IDENTIFY IN A SECOND PORTION OF THE DERIVATIVE SIGNAL A FOURTH
CHANGE POINT THAT DEMARCATES A SEVENTH SIGNAL REGION AND AN
EIGHTH SIGNAL REGION.                                                                 1339

DETERMINE THAT THE EIGHTH SIGNAL REGION OF THE DERIVATIVE SIGNAL
HAS A VALUE THAT IS SUBSTANTIALLY ZERO.                                               1340

ADJUST THE MODIFIED WELL LOG BY REMOVING THE EIGHTH SIGNAL
REGION FROM THE SIGNAL.                                                               1341

SELECT A FIFTH CHANGE POINT IN THE MODIFIED FIRST WELL LOG AND A SIXTH
CHANGE POINT IN THE SECOND WELL LOG.                                                  1345

POSITION A FIRST WINDOW WITHIN THE MODIFIED FIRST WELL LOG BASED AT
LEAST IN PART ON THE FIFTH CHANGE POINT.                                              1350

POSITION A SECOND WINDOW AT A FIRST LOCATION WITHIN THE SECOND WELL
LOG BASED AT LEAST IN PART ON THE SIXTH CHANGE POINT.                                 1355

DETERMINE A FIRST SIMILARITY VALUE BETWEEN THE FIRST SIGNAL IN THE FIRST
WINDOW AND THE SECOND SIGNAL IN THE SECOND WINDOW AT THE FIRST
LOCATION.                                                                            1360

REPOSITION THE SECOND WINDOW AT A SECOND LOCATION WITHIN THE SECOND
WELL LOG BASED AT LEAST IN PART ON THE SIXTH CHANGE POINT.                            1365

FROM 1365

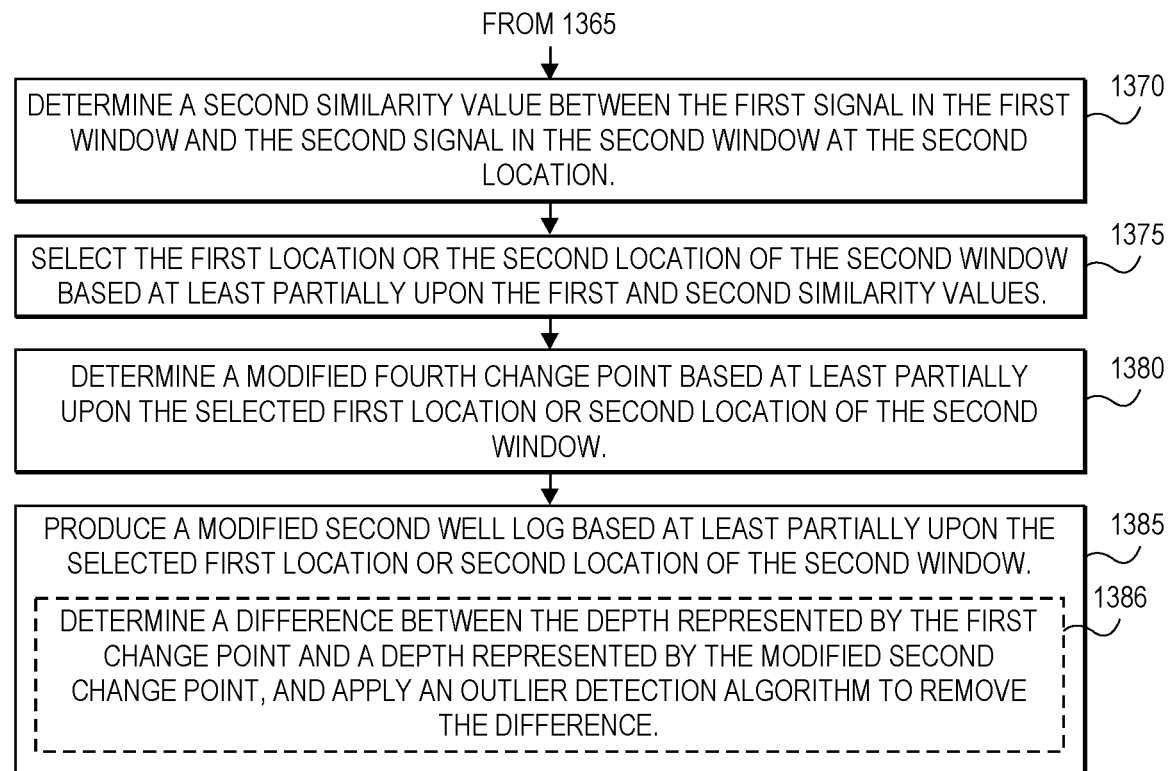

DETERMINE A SECOND SIMILARITY VALUE BETWEEN THE FIRST SIGNAL IN THE FIRST WINDOW AND THE SECOND SIGNAL IN THE SECOND WINDOW AT THE SECOND LOCATION.　　1370

SELECT THE FIRST LOCATION OR THE SECOND LOCATION OF THE SECOND WINDOW BASED AT LEAST PARTIALLY UPON THE FIRST AND SECOND SIMILARITY VALUES.　　1375

DETERMINE A MODIFIED FOURTH CHANGE POINT BASED AT LEAST PARTIALLY UPON THE SELECTED FIRST LOCATION OR SECOND LOCATION OF THE SECOND WINDOW.　　1380

PRODUCE A MODIFIED SECOND WELL LOG BASED AT LEAST PARTIALLY UPON THE SELECTED FIRST LOCATION OR SECOND LOCATION OF THE SECOND WINDOW.　　1385

DETERMINE A DIFFERENCE BETWEEN THE DEPTH REPRESENTED BY THE FIRST CHANGE POINT AND A DEPTH REPRESENTED BY THE MODIFIED SECOND CHANGE POINT, AND APPLY AN OUTLIER DETECTION ALGORITHM TO REMOVE THE DIFFERENCE.　　1386

FIG. 13C

WELLBORE DATA DEPTH MATCHING USING CHANGE POINT ALGORITHMS

CROSS-REFERENCE TO RELATED APPLICATION

This application is a National Stage Entry of International Application No. PCT/US2021/034537 filed May 27, 2021, which claims benefit of U.S. Provisional Patent Application Ser. No. 63/200,772 filed Mar. 26, 2021, which is incorporated herein by reference in its entirety.

BACKGROUND

Well logs are collected from wellbores using logging equipment. In some instances, several logging runs may be conducted. In some instances, two well logs conducted in the same well may show a particular subterranean feature (e.g., a change of formation) at two different depths. For example, a first well log may show a particular subterranean feature at a first depth, and a second well log may show the particular subterranean feature at a second, different depth. Accordingly, the well logs are adjusted to a common depth reference before data processing can continue. One existing approach to adjust the well logs to a common depth reference is based on correlation comparisons between the two well logs. More particularly, the well logs are depth-shifted based on multi-pass cross-correlation measures; however, this is generally followed by subsequent manual adjustments to further improve alignment. Another existing approach applies dynamic time warping to align two well logs; however, this can lead to pathological alignment due to noise accumulation.

SUMMARY

Embodiments of the present disclose may provide a method. The method includes receiving a first well log having a first signal, and a second well log having a second signal. The method also includes identifying in the first signal a first change point that demarcates a first signal region and a second signal region. The method also includes determining that the first signal region of the first signal is inconsistent in comparison to the second signal region. The method also includes producing a derivative signal by calculating a derivative of at least a portion of the first signal. The method also includes identifying in the derivative signal a second change point that demarcates a third signal region and a fourth signal region. The method also includes determining that the third signal region of the derivative signal has a value that is substantially zero. The method also includes producing a modified first well log by removing the first signal region from the first signal in response to determining that the first signal region of the signal is inconsistent in comparison to the second signal region, and by removing the third signal region from the first signal in response to determining that the third signal region of the derivative signal has the value that is substantially zero. The method also includes selecting a third change point in the modified first well log and a fourth change point in the second well log. The method also includes positioning a first window within the modified first well log based at least in part on the third change point. The method also includes positioning a second window at a first location within the second well log based at least in part on the fourth change point. The method also includes determining a first similarity value between the first signal in the first window and the second signal in the second window at the first location. The method also includes repositioning the second window at a second location within the second well log based at least in part on the fourth change point. The method also includes determining a second similarity value between the first signal in the first window and the second signal in the second window at the second location. The method also includes selecting the first location or the second location of the second window based at least partially upon the first and second similarity values. The method also includes producing a modified second well log based at least partially upon the selected first location or second location of the second window.

In an embodiment, the method may also include determining a modified fourth change point based at least partially upon the selected first location or second location of the second window. The modified second well log is produced based at least partially upon the modified fourth change point.

Embodiments of the present disclosure may also include another method. The method includes receiving a well log having a signal. The method also includes identifying in the signal a first change point that demarcates a first signal region and a second signal region. The method also includes determining that the first signal region is inconsistent in comparison to the second signal region. The method also includes producing a modified well log by removing the first signal region from the signal in response to determining that the first signal region is inconsistent in comparison to the second signal region.

In an embodiment, determining that the first signal region is inconsistent in comparison to the second signal region may include determining an upper bound and a lower bound based at least partially upon the second signal region, and determining that a mean of the first signal region is not between the upper and lower bounds.

In an embodiment, the method may also include determining an empirical standard deviation of the second signal region. The upper and lower bounds are based upon the empirical standard deviation of the second signal region.

In an embodiment, determining that the first signal region is inconsistent in comparison to the second signal region may include comparing a mean of the first signal region to a mean of the second signal region in combination with a product. The product may include a predetermined input multiplied by an empirical standard deviation of the second signal region.

In an embodiment, determining that the first signal region is inconsistent in comparison to the second signal region may include determining that a mean of the first signal region is less than a mean of the second signal region minus a product. The product may include a predetermined input multiplied by an empirical standard deviation of the second signal region.

In an embodiment, determining that the first signal region is inconsistent in comparison to the second signal region may include determining that a mean of the first signal region is greater than a mean of the second signal region plus a product. The product may include a predetermined input multiplied by an empirical standard deviation of the second signal region.

In an embodiment, the method may also include producing a derivative signal by calculating a derivative of at least a portion of the signal. The method may also include identifying in the derivative signal a second change point that demarcates a third signal region and a fourth signal region. The method may also include determining that the third signal region of the derivative signal has a value that is substantially zero. The method may also include adjusting the modified well log by removing the third signal region from the signal in response to determining that the third signal region of the derivative signal has the value that is substantially zero.

In an embodiment, the first change point may be identified in a predetermined portion of the signal using a change point detection algorithm. The second change point may be identified in a predetermined portion of the derivative signal using the change point detection algorithm. The predetermined portion of the signal at least partially overlaps with the predetermined portion of the derivative signal. The change point detection algorithm is selected from the group consisting of a binary segmentation algorithm, a segment neighborhood algorithm, and a pruned exact linear time (PELT) algorithm.

In an embodiment, the second signal region may represent a depth that at least partially overlaps with depths represented by the third signal region, the fourth signal region, or both.

In an embodiment, the method may also include removing the first signal region from the signal prior to producing the derivative signal such that the derivative signal does not include the first signal region.

In an embodiment, the method may also include removing the first signal region from the signal prior to determining the second change point such that the second change point is not located within the first signal region.

In an embodiment, the first change point, the first signal region, and the second signal region may be in a first portion of the signal. The second change point, the third signal region, and the fourth signal region may be in a first portion of the derivative signal. The method may also include identifying in a second portion of the signal a third change point that demarcates a fifth signal region and a sixth signal region. The method may also include determining that the sixth signal region of the signal is inconsistent in comparison to the fifth signal region. The method may also include adjusting the modified well log by removing the sixth signal region from the signal in response to determining that the sixth signal region of the signal is inconsistent in comparison to the fifth signal region.

In an embodiment, the method may also include identifying in a second portion of the derivative signal a fourth change point that demarcates a seventh signal region and an eighth signal region. The method may also include determining that the eighth signal region of the derivative signal has a value that is substantially zero. The method may also include adjusting the modified well log by removing the eighth signal region from the signal in response to determining that the eighth signal region of the derivative signal has the value that is substantially zero.

In an embodiment, the method may also include receiving a second well log having a second signal. The method may also include positioning a first window within the modified well log. The method may also include positioning a second window at a first location within the second well log. The method may also include determining a first similarity value between the signal in the first window and the second signal in the second window at the first location. The method may also include repositioning the second window at a second location within the second well log. The method may also include determining a second similarity value between the signal in the first window and the second signal in the second window at the second location. The method may also include selecting the first location or the second location of the second window based at least partially upon the first and second similarity values. The method may also include producing a modified second well log based at least partially upon the selected first location or second location of the second window.

Embodiments of the present disclosure may also provide another method. The method includes receiving a first well log and a second well log. The first well log includes a first signal, and the second well log includes a second signal. The method also includes selecting a second change point in the second well log. The second change point represents a depth in the second well log. The second change point is selected based on a proximity to a depth represented by a first change point in the first well log. The method also includes positioning a first window in the first well log based at least in part on the first change point. The method also includes positioning a second window at a first location in the second well log based at least in part on the second change point. The method also includes determining a first similarity value between the first signal in the first window and the second signal in the second window at the first location. The method also includes repositioning the second window at a second location in the second well log based at least in part on the second change point. The method also includes determining a second similarity value between the first signal in the first window and the second signal in the second window at the second location. The method also includes selecting the first location or the second location of the second window based at least partially upon the first and second similarity values. The method also includes determining a modified second change point based at least partially upon the selected first location or second location of the second window. The method also includes producing a modified second well log based at least partially upon the modified second change point.

In an embodiment, producing the modified second well log may include determining a difference between the depth represented by the first change point and a depth represented by the modified second change point, and applying an outlier detection algorithm to remove the difference, which causes the modified second well log to be more aligned with the first well log than the second well log is with the first well log.

In an embodiment, the first well log may include a plurality of change points including the first change point. The second well log may include a plurality of change points including the second change point. The depth of the second change point is the closest of the plurality of change points in the second well log to the depth of the first change point in the first well log.

In an embodiment, the first change point may be positioned within the first window. The second change point may be positioned within the second window at the first location and positioned within the second window at the second location.

In an embodiment, the first change point may be positioned within the first window. The second change point may not be positioned within the second window at the first location.

In an embodiment, the modified second well log may include a modified second signal. The method may also include identifying in the modified second signal a third change point that demarcates a first signal region and a second signal region. The method may also include determining that the first signal region of the modified second signal is inconsistent in comparison to the second signal region. The method may also include adjusting the modified second well log by removing the first signal region from the modified second signal in response to determining that the first signal region of the modified second signal is inconsistent in comparison to the second signal region.

Embodiments of the present disclosure may also provide a computing system. The computing system may include a processor and a memory system including a non-transitory computer-readable medium storing instructions that, when executed by the processor, cause the computing system to perform operations. The operations may include receiving a first well log having a first signal, and a second well log having a second signal. The operations may also include identifying in the first signal a first change point that demarcates a first signal region and a second signal region. The operations may also include determining that the first signal region of the first signal is inconsistent in comparison to the second signal region. The operations may also include producing a derivative signal by calculating a derivative of at least a portion of the first signal. The operations may also include identifying in the derivative signal a second change point that demarcates a third signal region and a fourth signal region. The operations may also include determining that the third signal region of the derivative signal has a value that is substantially zero. The operations may also include producing a modified first well log by removing the first signal region from the first signal in response to determining that the first signal region of the signal is inconsistent in comparison to the second signal region, and by removing the third signal region from the first signal in response to determining that the third signal region of the derivative signal has the value that is substantially zero. The operations may also include selecting a third change point in the modified first well log and a fourth change point in the second well log. The operations may also include positioning a first window within the modified first well log based at least in part on the third change point. The operations may also include positioning a second window at a first location within the second well log based at least in part on the fourth change point. The operations may also include determining a first similarity value between the first signal in the first window and the second signal in the second window at the first location. The operations may also include repositioning the second window at a second location within the second well log based at least in part on the fourth change point. The operations may also include determining a second similarity value between the first signal in the first window and the second signal in the second window at the second location. The operations may also include selecting the first location or the second location of the second window based at least partially upon the first and second similarity values. The operations may also include producing a modified second well log based at least partially upon the selected first location or second location of the second window.

Embodiments of the present disclosure may also provide another computing system. The computing system may include a processor and a memory system including a non-transitory computer-readable medium storing instructions that, when executed by the processor, cause the computing system to perform operations. The operations may include receiving a well log having a signal. The operations may also include identifying in the signal a first change point that demarcates a first signal region and a second signal region. The operations may also include determining that the first signal region is inconsistent in comparison to the second signal region. The operations may also include producing a modified well log by removing the first signal region from the signal in response to determining that the first signal region is inconsistent in comparison to the second signal region.

Embodiments of the present disclosure may also provide another computing system. The computing system may include a processor and a memory system including a non-transitory computer-readable medium storing instructions that, when executed by the processor, cause the computing system to perform operations. The operations may include receiving a first well log and a second well log. The first well log includes a first signal, and the second well log includes a second signal. The operations may also include selecting a second change point in the second well log. The second change point represents a depth in the second well log. The second change point is selected based on a proximity to a depth represented by a first change point in the first well log. The operations may also include positioning a first window in the first well log based at least in part on the first change point. The operations may also include positioning a second window at a first location in the second well log based at least in part on the second change point. The operations may also include determining a first similarity value between the first signal in the first window and the second signal in the second window at the first location. The operations may also include repositioning the second window at a second location in the second well log based at least in part on the second change point. The operations may also include determining a second similarity value between the first signal in the first window and the second signal in the second window at the second location. The operations may also include selecting the first location or the second location of the second window based at least partially upon the first and second similarity values. The operations may also include determining a modified second change point based at least partially upon the selected first location or second location of the second window. The operations may also include producing a modified second well log based at least partially upon the modified second change point.

Embodiments of the present disclosure may also provide a non-transitory computer-readable medium. The medium may store instructions that, when executed by at least one processor of a computing system, cause the computing system to perform operations. The operations may include receiving a first well log having a first signal, and a second well log having a second signal. The operations may also include identifying in the first signal a first change point that demarcates a first signal region and a second signal region. The operations may also include determining that the first signal region of the first signal is inconsistent in comparison to the second signal region. The operations may also include producing a derivative signal by calculating a derivative of at least a portion of the first signal. The operations may also include identifying in the derivative signal a second change point that demarcates a third signal region and a fourth signal region. The operations may also include determining that the third signal region of the derivative signal has a value that is substantially zero. The operations may also include producing a modified first well log by removing the first signal region from the first signal in response to determining that the first signal region of the signal is inconsistent in comparison to the second signal region, and by removing the third signal region from the first signal in response to determining that the third signal region of the derivative signal has the value that is substantially zero. The operations may also include selecting a third change point in the modified first well log and a fourth change point in the second well log. The operations may also include positioning a first window within the modified first well log based at least in part on the third change point. The operations may also include positioning a second window at a first location within the second well log based at least in part on the fourth change point. The operations may also include determining a first similarity value between the first signal in the first window and the second signal in the second window at the first location. The operations may also include repositioning the second window at a second location within the second well log based at least in part on the fourth change point. The operations may also include determining a second similarity value between the first signal in the first window and the second signal in the second window at the second location. The operations may also include selecting the first location or the second location of the second window based at least partially upon the first and second similarity values. The operations may also include producing a modified second well log based at least partially upon the selected first location or second location of the second window.

Embodiments of the present disclosure may also provide another non-transitory computer-readable medium. The medium may store instructions that, when executed by at least one processor of a computing system, cause the computing system to perform operations. The operations may include receiving a well log having a signal. The operations may also include identifying in the signal a first change point that demarcates a first signal region and a second signal region. The operations may also include determining that the first signal region is inconsistent in comparison to the second signal region. The operations may also include producing a modified well log by removing the first signal region from the signal in response to determining that the first signal region is inconsistent in comparison to the second signal region.

Embodiments of the present disclosure may also provide another non-transitory computer-readable medium. The medium may store instructions that, when executed by at least one processor of a computing system, cause the computing system to perform operations. The operations may include receiving a first well log and a second well log. The first well log includes a first signal, and the second well log includes a second signal. The operations may also include selecting a second change point in the second well log. The second change point represents a depth in the second well log. The second change point is selected based on a proximity to a depth represented by a first change point in the first well log. The operations may also include positioning a first window in the first well log based at least in part on the first change point. The operations may also include positioning a second window at a first location in the second well log based at least in part on the second change point. The operations may also include determining a first similarity value between the first signal in the first window and the second signal in the second window at the first location. The operations may also include repositioning the second window at a second location in the second well log based at least in part on the second change point. The operations may also include determining a second similarity value between the first signal in the first window and the second signal in the second window at the second location. The operations may also include selecting the first location or the second location of the second window based at least partially upon the first and second similarity values. The operations may also include determining a modified second change point based at least partially upon the selected first location or second location of the second window. The operations may also include producing a modified second well log based at least partially upon the modified second change point.

Embodiments of the present disclose may provide a method. The method includes means for receiving a first well log having a first signal, and a second well log having a second signal. The method also includes means for identifying in the first signal a first change point that demarcates a first signal region and a second signal region. The method also includes means for determining that the first signal region of the first signal is inconsistent in comparison to the second signal region. The method also includes means for producing a derivative signal by calculating a derivative of at least a portion of the first signal. The method also includes means for identifying in the derivative signal a second change point that demarcates a third signal region and a fourth signal region. The method also includes means for determining that the third signal region of the derivative signal has a value that is substantially zero. The method also includes means for producing a modified first well log by removing the first signal region from the first signal in response to determining that the first signal region of the signal is inconsistent in comparison to the second signal region, and by removing the third signal region from the first signal in response to determining that the third signal region of the derivative signal has the value that is substantially zero. The method also includes means for selecting a third change point in the modified first well log and a fourth change point in the second well log. The method also includes means for positioning a first window within the modified first well log based at least in part on the third change point. The method also includes means for positioning a second window at a first location within the second well log based at least in part on the fourth change point. The method also includes means for determining a first similarity value between the first signal in the first window and the second signal in the second window at the first location. The method also includes means for repositioning the second window at a second location within the second well log based at least in part on the fourth change point. The method also includes means for determining a second similarity value between the first signal in the first window and the second signal in the second window at the second location. The method also includes means for selecting the first location or the second location of the second window based at least partially upon the first and second similarity values. The method also includes means for producing a modified second well log based at least partially upon the selected first location or second location of the second window.

Embodiments of the present disclosure may also include another method. The method includes means for receiving a well log having a signal. The method also includes means for identifying in the signal a first change point that demarcates a first signal region and a second signal region. The method also includes means for determining that the first signal region is inconsistent in comparison to the second signal region. The method also includes means for producing a modified well log by removing the first signal region from the signal in response to determining that the first signal region is inconsistent in comparison to the second signal region.

Embodiments of the present disclosure may also provide another method. The method includes means for receiving a first well log and a second well log. The first well log includes a first signal, and the second well log includes a second signal. The method also includes means for selecting a second change point in the second well log. The second change point represents a depth in the second well log. The second change point is selected based on a proximity to a depth represented by a first change point in the first well log. The method also includes means for positioning a first window in the first well log based at least in part on the first change point. The method also includes means for positioning a second window at a first location in the second well log based at least in part on the second change point. The method also includes means for determining a first similarity value between the first signal in the first window and the second signal in the second window at the first location. The method also includes means for repositioning the second window at a second location in the second well log based at least in part on the second change point. The method also includes means for determining a second similarity value between the first signal in the first window and the second signal in the second window at the second location. The method also includes means for selecting the first location or the second location of the second window based at least partially upon the first and second similarity values. The method also includes means for determining a modified second change point based at least partially upon the selected first location or second location of the second window. The method also includes means for producing a modified second well log based at least partially upon the modified second change point.

Embodiments of the present disclosure may also provide a computing system. The computing system may include a processor and a memory system including a non-transitory computer-readable medium storing instructions that, when executed by the processor, cause the computing system to perform operations. The computing system is configured to receive a first well log having a first signal, and a second well log having a second signal. The computing system is configured to identify in the first signal a first change point that demarcates a first signal region and a second signal region. The computing system is configured to determine that the first signal region of the first signal is inconsistent in comparison to the second signal region. The computing system is configured to produce a derivative signal by calculating a derivative of at least a portion of the first signal. The computing system is configured to identify in the derivative signal a second change point that demarcates a third signal region and a fourth signal region. The computing system is configured to determine that the third signal region of the derivative signal has a value that is substantially zero. The computing system is configured to produce a modified first well log by removing the first signal region from the first signal in response to determining that the first signal region of the signal is inconsistent in comparison to the second signal region, and by removing the third signal region from the first signal in response to determining that the third signal region of the derivative signal has the value that is substantially zero. The computing system is configured to select a third change point in the modified first well log and a fourth change point in the second well log. The computing system is configured to position a first window within the modified first well log based at least in part on the third change point. The computing system is configured to position a second window at a first location within the second well log based at least in part on the fourth change point. The computing system is configured to determine a first similarity value between the first signal in the first window and the second signal in the second window at the first location. The computing system is configured to reposition the second window at a second location within the second well log based at least in part on the fourth change point. The computing system is configured to determine a second similarity value between the first signal in the first window and the second signal in the second window at the second location. The computing system is configured to select the first location or the second location of the second window based at least partially upon the first and second similarity values. The computing system is configured to produce a modified second well log based at least partially upon the selected first location or second location of the second window.

Embodiments of the present disclosure may also provide another computing system. The computing system may include a processor and a memory system including a non-transitory computer-readable medium storing instructions that, when executed by the processor, cause the computing system to perform operations. The computing system is configured to receive a well log having a signal. The computing system is configured to identify in the signal a first change point that demarcates a first signal region and a second signal region. The computing system is configured to determine that the first signal region is inconsistent in comparison to the second signal region. The computing system is configured to produce a modified well log by removing the first signal region from the signal in response to determining that the first signal region is inconsistent in comparison to the second signal region.

Embodiments of the present disclosure may also provide another computing system. The computing system may include a processor and a memory system including a non-transitory computer-readable medium storing instructions that, when executed by the processor, cause the computing system to perform operations. The computing system is configured to receive a first well log and a second well log. The first well log includes a first signal, and the second well log includes a second signal. The computing system is configured to select a second change point in the second well log. The second change point represents a depth in the second well log. The second change point is selected based on a proximity to a depth represented by a first change point in the first well log. The computing system is configured to position a first window in the first well log based at least in part on the first change point. The computing system is configured to position a second window at a first location in the second well log based at least in part on the second change point. The computing system is configured to determine a first similarity value between the first signal in the first window and the second signal in the second window at the first location. The computing system is configured to reposition the second window at a second location in the second well log based at least in part on the second change point. The computing system is configured to determine a second similarity value between the first signal in the first window and the second signal in the second window at the second location. The computing system is configured to select the first location or the second location of the second window based at least partially upon the first and second similarity values. The computing system is configured to determine a modified second change point based at least partially upon the selected first location or second location of the second window. The computing system is configured to produce a modified second well log based at least partially upon the modified second change point.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 1A, 1B, 1C, 1D, 2, 3A, and 3B illustrate simplified, schematic views of an oilfield and its operation, according to an embodiment.

FIG. 5 illustrates a flowchart of a method for detecting and/or removing statistically aberrant signal regions in a well log, according to an embodiment.

FIG. 10 illustrates a flowchart of a method for aligning signals in the first and second well logs, according to an embodiment.

FIGS. 13A, 13B, and 13C illustrate a flowchart of a method, according to an embodiment.

DETAILED DESCRIPTION

Figure 2:
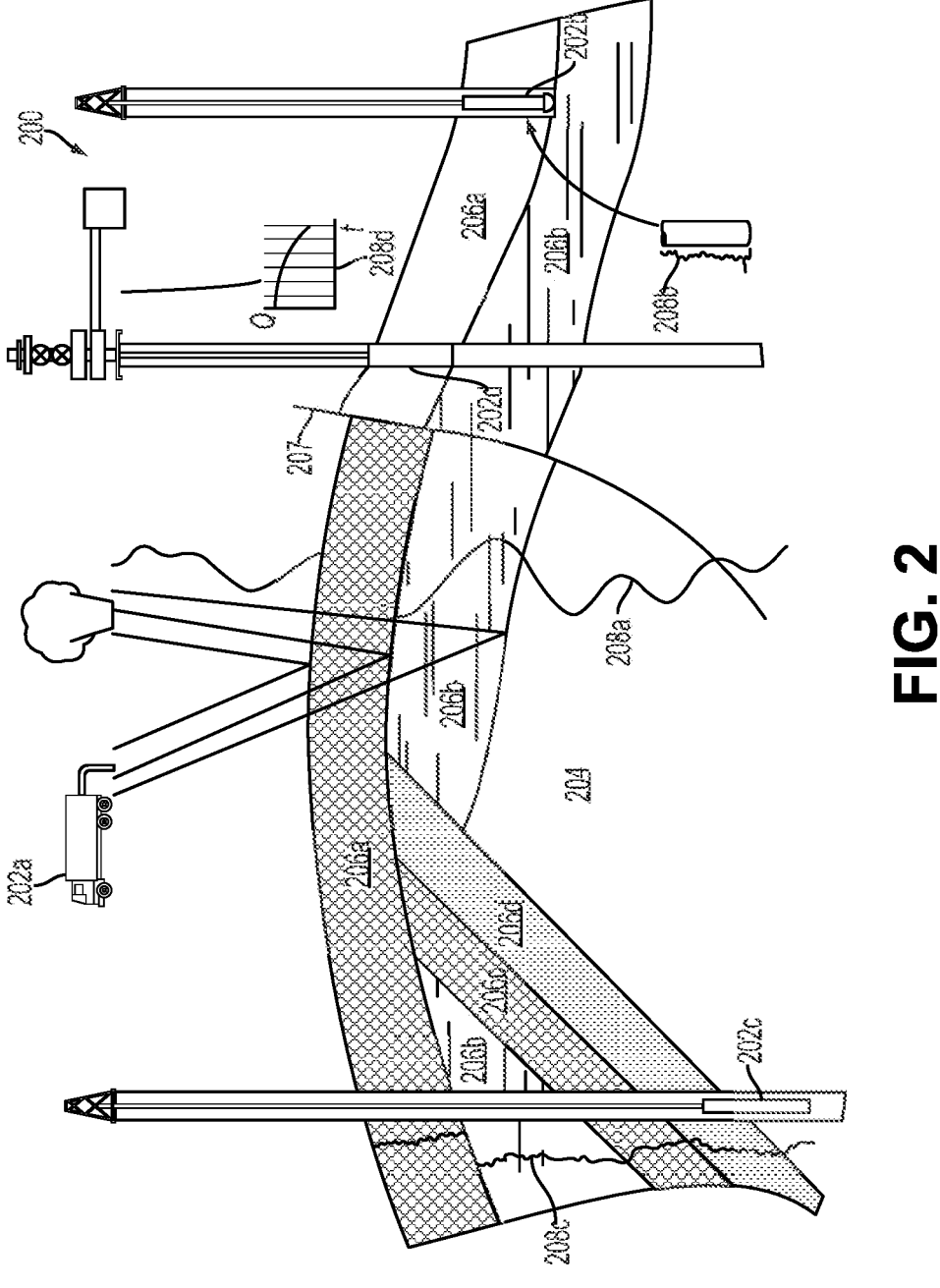

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the invention. The first object and the second object are both objects, respectively, but they are not to be considered the same object.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

FIGS. 1A-1D illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106a, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122a of a seismic truck 106a, and responsive to the input data, computer 122a generates seismic data output 124. This seismic data output may be stored, transmitted or further processed as desired, for example, by data reduction.

FIG. 1B illustrates a drilling operation being performed by drilling tools 106b suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106b may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electro-magnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

FIG. 1C illustrates a wireline operation being performed by wireline tool 106c suspended by rig 128 and into wellbore 136 of FIG. 1B. Wireline tool 106.3 is adapted for deployment into wellbore 136 for generating well logs, performing downhole tests and/or collecting samples. Wireline tool 106c may be used to provide another method and apparatus for performing a seismic survey operation. Wireline tool 106c may, for example, have an explosive, radioactive, electrical, or acoustic energy source 144 that sends and/or receives electrical signals to surrounding subterranean formations 102 and fluids therein.

Wireline tool 106c may be operatively connected to, for example, geophones 118 and a computer 122a of a seismic truck 106a of FIG. 1A. Wireline tool 106c may also provide data to surface unit 134. Surface unit 134 may collect data generated during the wireline operation and may produce data output 135 that may be stored or transmitted. Wireline tool 106c may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106c to measure downhole parameters which relate to, for example porosity, permeability, fluid composition and/or other parameters of the field operation.

FIG. 1D illustrates a production operation being performed by production tool 106d deployed from a production unit or Christmas tree 129 and into completed wellbore 136 for drawing fluid from the downhole reservoirs into surface facilities 142. The fluid flows from reservoir 104 through perforations in the casing (not shown) and into production tool 106d in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106d or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more wellsites.

FIG. 2 illustrates a schematic view, partially in cross section of oilfield 200 having data acquisition tools 202a, 202b, 202c, and 202d positioned at various locations along oilfield 200 for collecting data of subterranean formation 204 in accordance with implementations of various technologies and techniques described herein. Data acquisition tools 202a-202d may be the same as data acquisition tools 106a-106d of FIGS. 1A-1D, respectively, or others not depicted. As shown, data acquisition tools 202a-202d generate data plots or measurements 208a-208d, respectively. These data plots are depicted along oilfield 200 to demonstrate the data generated by the various operations.

Data plots 208a-208c are examples of static data plots that may be generated by data acquisition tools 202a-202c, respectively; however, it should be understood that data plots 208a-208c may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208a is a seismic two-way response over a period of time. Static plot 208b is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208c is a logging trace that typically provides a resistivity or other measurement of the formation at various depths.

A production decline curve or graph 208d is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206a-206d. As shown, this structure has several formations or layers, including a shale layer 206a, a carbonate layer 206b, a shale layer 206c and a sand layer 206d. A fault 207 extends through the shale layer 206a and the carbonate layer 206b. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208a from data acquisition tool 202a is used by a geophysicist to determine characteristics of the subterranean formations and features. The core data shown in static plot 208b and/or log data from well log 208c are typically used by a geologist to determine various characteristics of the subterranean formation. The production data from graph 208d is typically used by the reservoir engineer to determine fluid flow reservoir characteristics. The data analyzed by the geologist, geophysicist and the reservoir engineer may be analyzed using modeling techniques.

Figure 3A:
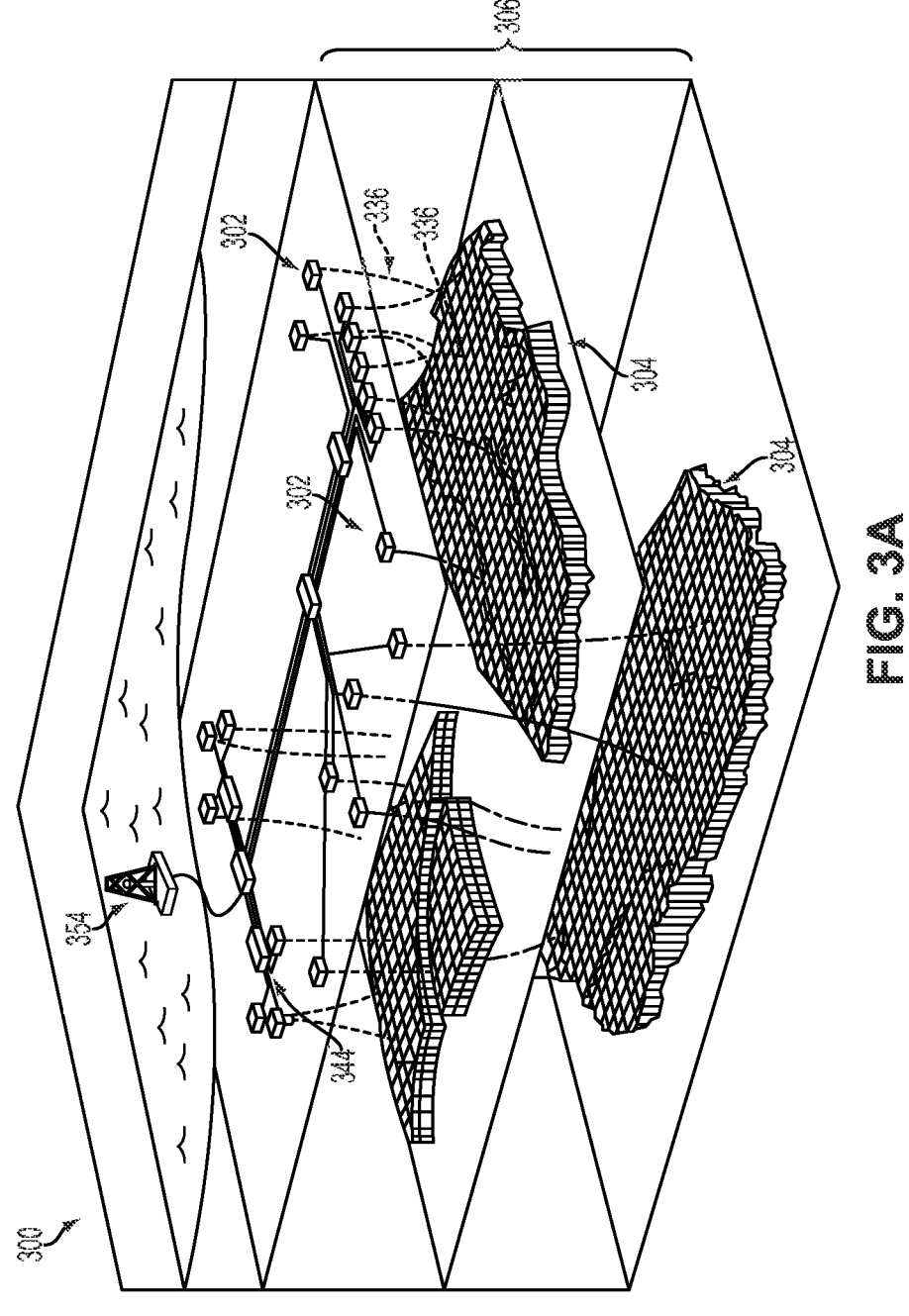

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Figure 3B:
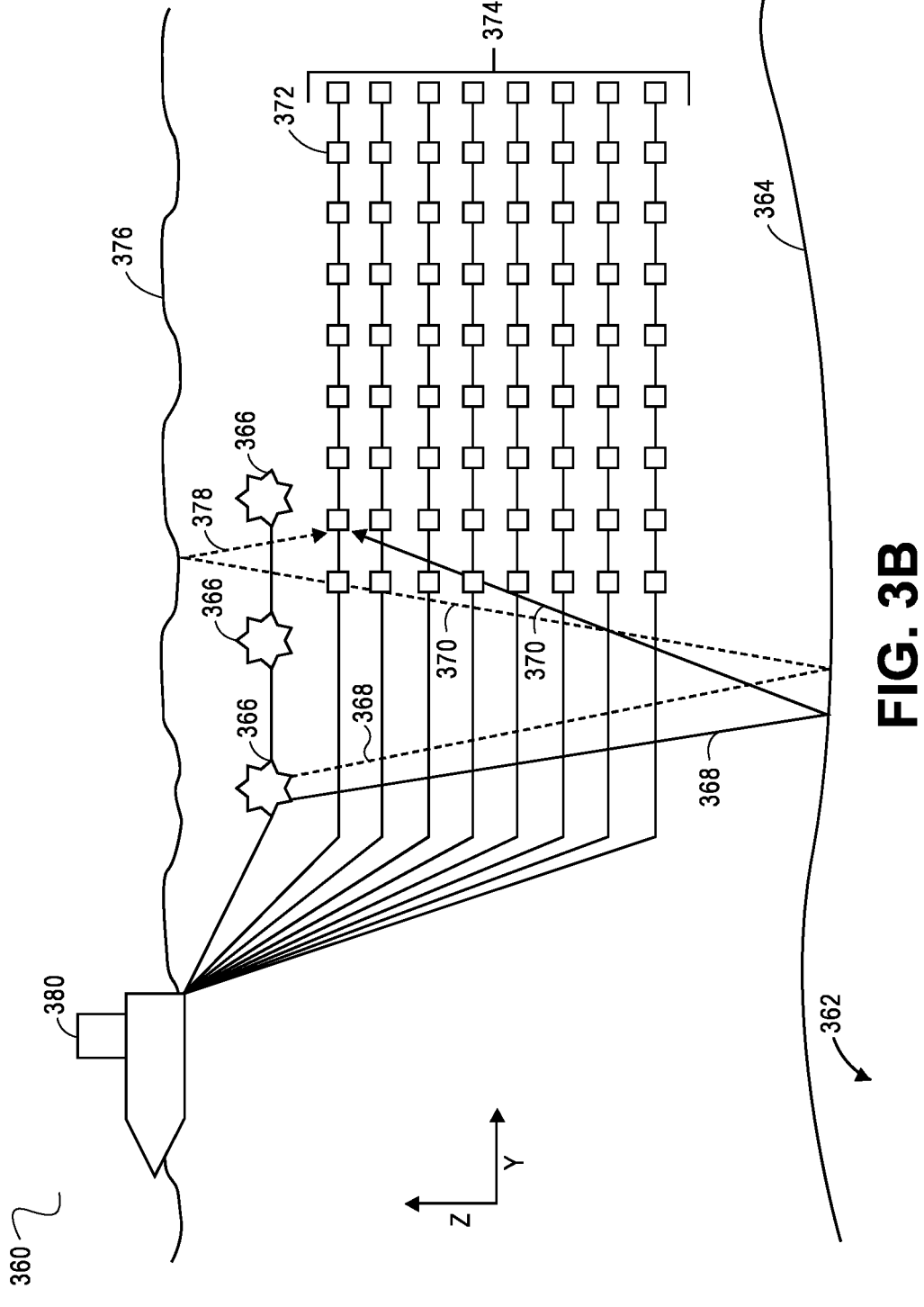

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362.

Marine seismic acquisition systems tow each streamer in streamer array 374 at the same depth (e.g., 5-10 m). However, marine based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

First and Last Reading Anomaly Detection Using Change Point Algorithms

Figure 4:
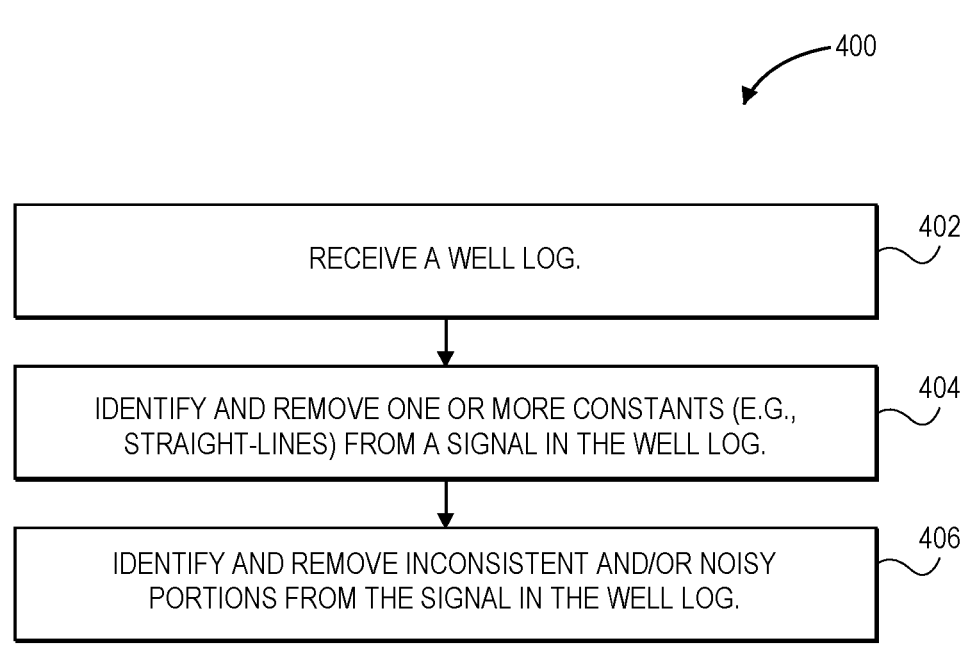
FIG. 4 illustrates a flowchart of a method for pre-processing wellbore data, according to an embodiment.

FIG. 4 illustrates a flowchart of a method 400 for preprocessing wellbore data, according to an embodiment. The method 400 may include receiving a well log, as at 402. The well log may include one or more signals that represent measurements taken by sensors in the well. The method 400 may also include identifying and removing one or more constants (e.g., straight-lines) from the signal in the well log, as at 404. The method 400 may also include identifying and removing inconsistent and/or noisy portions from the signal in the well log, as at 406. Thus, the systems and methods disclosed herein may provide a unified framework that detects and/or removes constants, inconsistent data, noisy data, or a combination thereof from the well log.

Figure 6A:
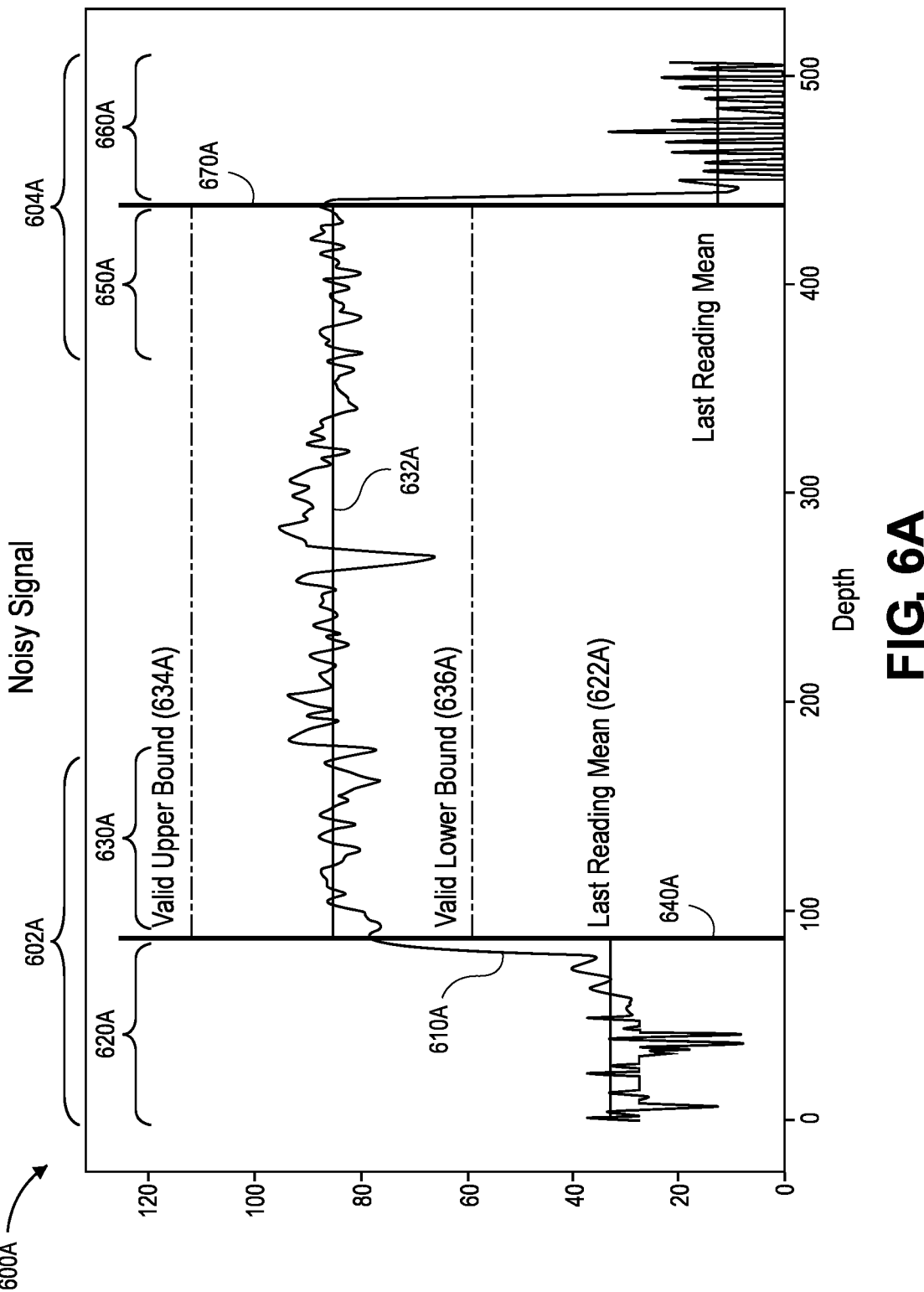
FIG. 6A illustrates a well log including a signal that has inconsistent and/or noisy data, according to an embodiment.
Figure 6B:
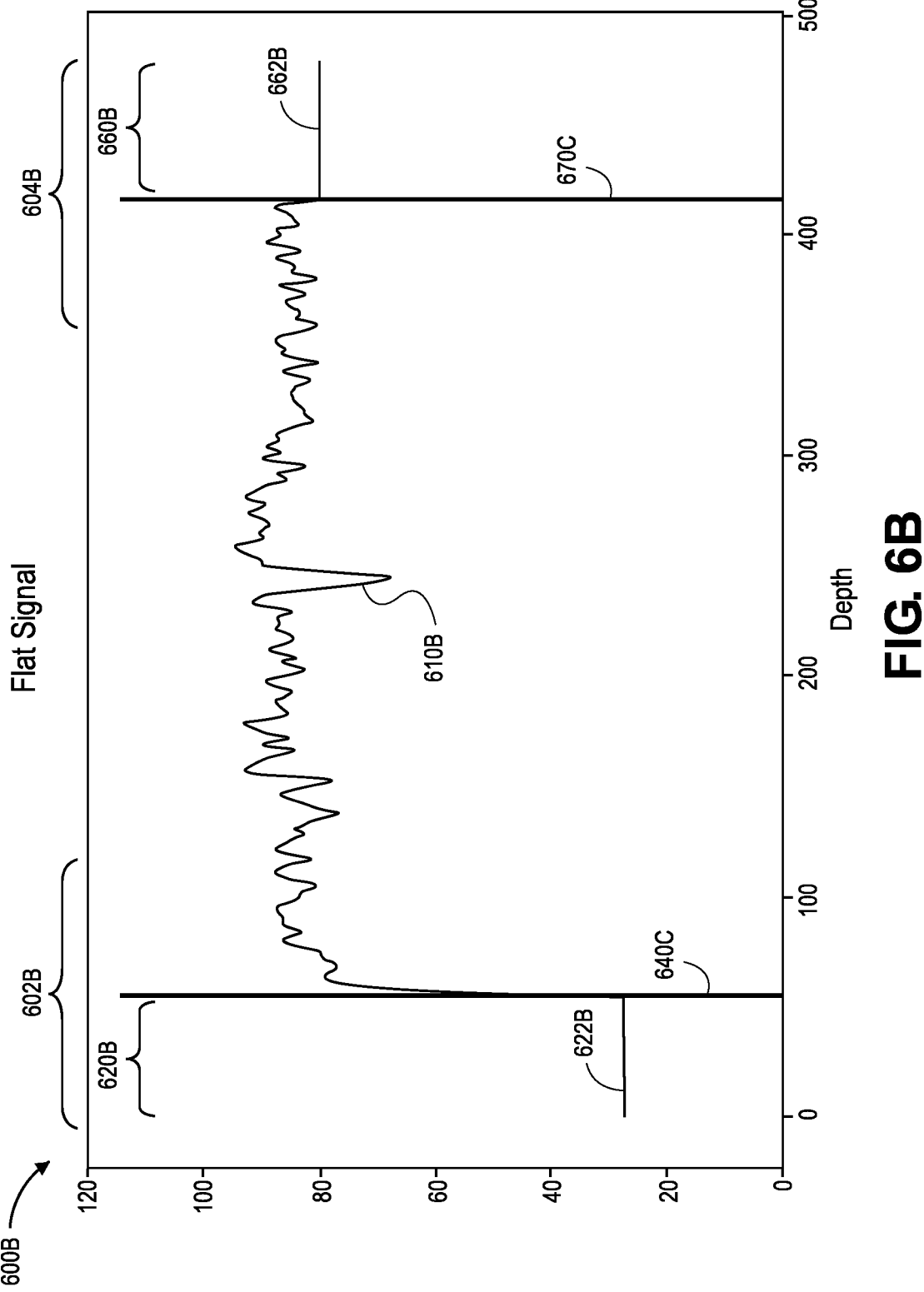
FIG. 6B illustrates another well log including a signal having one or more constants (e.g., straight lines), according to an embodiment.
Figure 6C:
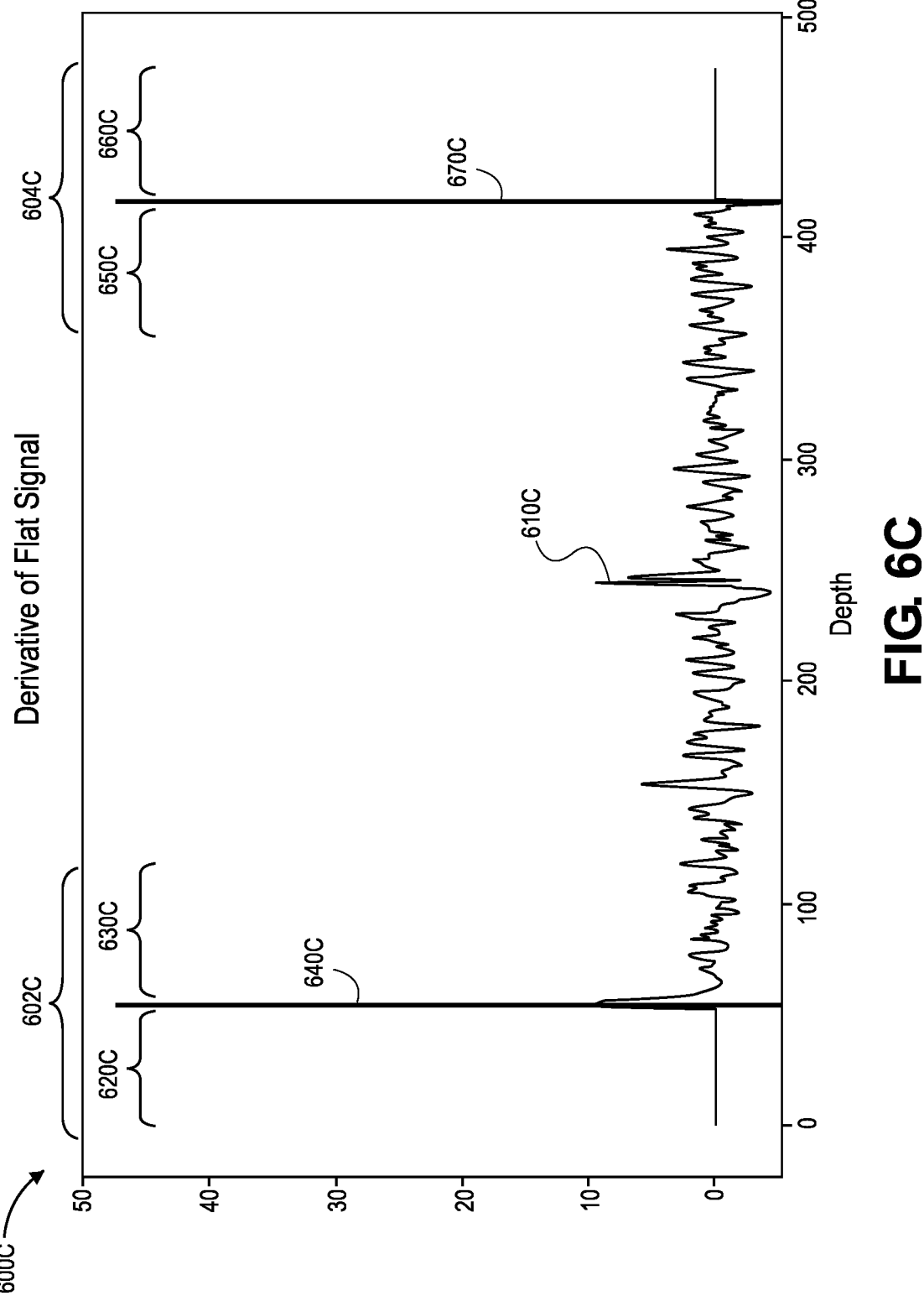
FIG. 6C illustrates a derivative of the signal in FIG. 6B, according to an embodiment.

FIG. 5 illustrates a flowchart of a method 500 for detecting and/or removing statistically aberrant signal regions in a well log, according to an embodiment. The method 500 is illustrated with reference to FIGS. 6A-6C, FIG. 7, and FIGS. 8A and 8B. Different portions of the method 500 are illustrated on different well logs (e.g., different signals) for clarity. More particularly, the portion of the method 500 directed to the detection and removal of inconsistent measurements is illustrated in FIGS. 6A and 8A, and the portion of the method 500 directed to the detection and removal of constants (e.g., straight lines) is illustrated in FIGS. 6B, 6C and 8B. However, in another embodiment, one or more portions of the method 500 may also or instead be performed with respect to a single well log (e.g., a single signal).

FIG. 6A illustrates an example of a well log 600A including a signal 610A that has inconsistent and/or noisy data, according to an embodiment. The well log 600A may be or include a gamma ray log, a resistivity log, a sonic log, a neutron log, a density log, a pressure log, a temperature log, or the like. The signal 610A in the well log 600A may represent measurements taken using one or more sensors configured to measure gamma rays, resistivity, etc. Such measurement data (and thus the signal 610A) thus provide data representing one or more subsurface rock properties. The signal 610A includes a plurality of samples (e.g., discrete points).

The method 500 may be used to detect and/or remove inconsistent data, noisy data, constants (e.g., straight-lines), or a combination thereof. More particularly, referring now to FIGS. 5 and 6A, the method 500 may be used to detect and/or remove inconsistent and/or noisy data in a first (e.g., beginning) portion 602A and/or a second (e.g., end) portion 604A of the signal 610A. An illustrative order of the method 500 is provided below; however, one or more portions of the method 500 may be performed in a different order, performed simultaneously, repeated, or omitted.

The method 500 may include receiving a well log 600A, as at 502. The well log 600A may be captured in a wellbore by a downhole tool, such as any of the downhole tools 106.1-106.4 and/or the downhole tools 202.1-202.4 described above.

First (e.g., Beginning) Portion of the Signal

The method 500 may also include selecting a first (e.g., beginning) portion 602A of the signal 610A in the well log 600A, as at 504. This may include selecting a first n samples (e.g., 500 samples) of the signal 610A. As shown, the beginning portion 602A may represent a depth range (e.g., from about 0 m to about 200 m). In another embodiment, the beginning portion 602A may represent a time range (e.g., from about 0 minutes to about 15 minutes).

The method 500 may also include identifying a first change point 640A in the signal 610A, as at 506. The first change point 640A may be identified in the beginning portion 602A of the signal 610A. As may be seen in FIG. 6A, the first change point 640A may demarcate a first signal region 620A before/above the first change point 640A and a second signal region 630A after/below the first change point 640A. In this particular example, the first signal region 620A represents a depth from about 0 m to about 90 m, the change point 640A exists at a depth of about 90 m, and the second signal region 630A represents a depth from about 90 m to about 200 m.

In at least one embodiment, the first change point 640A may be determined using a change point detection algorithm. The change point detection algorithm estimates the point(s) (e.g., point 640A) in the signal 610A at which the statistical properties of a sequence of observations change (e.g., a mean or a variance). In other words, the change point 640A may be or include the point where the signal 610A jumps (e.g., in amplitude) by a predetermined amount. For example, the amplitude of the signal in the first signal region 620A (e.g., before the change point 640A) is from about 8 to about 40. The amplitude of the signal 610A then jumps at the change point 640A to from about 65 to about 100 in the second signal region 630A (e.g., after the change point 640A).

Examples of change point detection algorithms include a binary segmentation algorithm, a segment neighborhood algorithm, and the Pruned Exact Linear Time (PELT) algorithm. One existing challenge in applying a change point detection algorithm to a signal is estimating the number of change points to identify. In one embodiment, the method 500 may use/determine a single change point (e.g., not multiple change points) for the beginning portion 602A of the signal 610A, and a single change point for the end portion of the signal 610A. An example of applying a change point detection algorithm to the beginning portion 602A of the signal 610A to determine the first change point 640A is provided below.

A log measurement sequence of the signal 610A may be defined as follows:

$$y_{1:n} = (y_1, \ldots, y_n) \qquad \text{Equation 1}$$

where y is the signal 610A, and n is a user input that represents the size of the log measurement(s) to consider (e.g., the n-first samples or the n-last samples). The change point detection algorithm may be used to select a segmentation index k ($0<k<n$) where k represents the change point 640A between 0 (or 1) and n. The signal 610A may be split at the change point 640A according to a quantitative criterion V(k,y):

$$V(k, y) = c(y_{0:k}) + c(y_{k:n}) \qquad \text{Equation 2}$$

where V is a cost function to be optimized (e.g., minimized), and c is a cost function that measures a goodness-of-fit of a subset of the signal 610A. Thus, the position k may be found where V is the minimum. The cost function c may measure the "homogeneity" of a subsequence. The quadratic error loss cost function may be defined as follows:

$$c_{l2}(y_{0:k}) = \sum_{t=0}^{k} \|y_t - \bar{y}_{0:k}\|_2^2 \qquad \text{Equation 3}$$

where $\bar{y}_{0:k}$ is the empirical mean of the sub-signal from 0 to k. To perform the segmentation, the quantitative criterion V(k,y) may be minimized. The k* optimal index is the one that minimizes the quantitative criteria:

$$k^* = \arg\min_k V(k, y_{0:n}) \text{ with } 0 < k < n \qquad \text{Equation 4}$$

Where k* is an optimum position where V is the minimum. Thus, k* is considered to be the change point.

The method 500 may also include determining that the first signal region 620A is inconsistent in comparison with the second signal region 630A, as at 508. In at least one embodiment, this may also or instead include determining that the first signal region 620A is noisy (e.g., in comparison with the second signal region 630A).

Detection of Inconsistent Measurements

In at least one embodiment, determining whether the first signal region 620A is inconsistent in comparison to the second signal region 630A may include determining a mean 622A of the first signal region 620A ($\bar{y}_{0:k}$) and a mean 632A of the second signal region 630A ($\bar{y}_{k^*:n}$), as shown below:

$$\bar{y}_{0:k^*} \text{ and } \bar{y}_{k^*:n} \qquad \text{Equation 5}$$

The first signal region 620A (samples 0 to k* in the signal 610A) is determined to be inconsistent in comparison to the second signal region 630A (samples k* to n) in response to the mean 622A of the first signal region 620A being out of bounds, as shown by one or both equations below:

$$\bar{y}_{0:k} < \bar{y}_{k^*:n} - m * \sigma(y_{k^*:n}) \qquad \text{Equation 6}$$

$$\bar{y}_{0:k} > \bar{y}_{k^*:n} + m * \sigma(y_{k^*:n}) \qquad \text{Equation 7}$$

where m is a user input (e.g., which may be set by default to 3) representing where the signal is rejected in a Gaussian distribution, and $\sigma(y_{k^*:n})$ is the empirical standard deviation of the sub signal $y_{k^*:n}$, which may yield the upper and lower bounds 634A, 636A. In one example, if m is set to 3, there may be 0.1% of the samples that verify the condition of Equation 6.

In other words, Equation 6 states that the first signal region 620A is inconsistent in response to the mean 622A of the first signal region 620A being less than the mean 632A of the second signal region 630A minus a product. The product is the user input m (e.g., 3) multiplied by the empirical standard deviation of the second signal region 630A. Equation 7 states that the first signal region 620A is inconsistent in response to the mean 622A of the first signal region 620A being greater than the mean 632A of the second signal region 630A plus the product.

In at least one embodiment, if the mean 622A of the signal 610A in the first signal region 620A is not between the bounds 634A, 636A, the first signal region 620A may be determined to be inconsistent in comparison to the second signal region 630A (e.g., an anomaly is detected in the first signal region 620A). In another embodiment, if a predetermined portion (e.g., 80%) of the signal 610A in the first signal region 620A is not between the bounds 634A, 636A, the first signal region 620A may be determined to be inconsistent in comparison to the second signal region 630A (e.g., an anomaly is detected in the first signal region 620A).

In at least one embodiment, this approach may also be used to identify a change point in two or more (e.g., simultaneous) signals. For example, the following may be used:

$$c_{Im}(y_{0:k}) = \sum_{t=0}^{k} \|y_t - \bar{y}_{0:k}\|_M^2 \qquad \text{Equation 8}$$

where y takes value in $\mathbb{R}^d$, and $M \in \mathbb{R}^{d*d}$ is the inverse of the covariance matrix of the signal 610A, and d is the number of signals (e.g., two or more signals).

Figure 7:
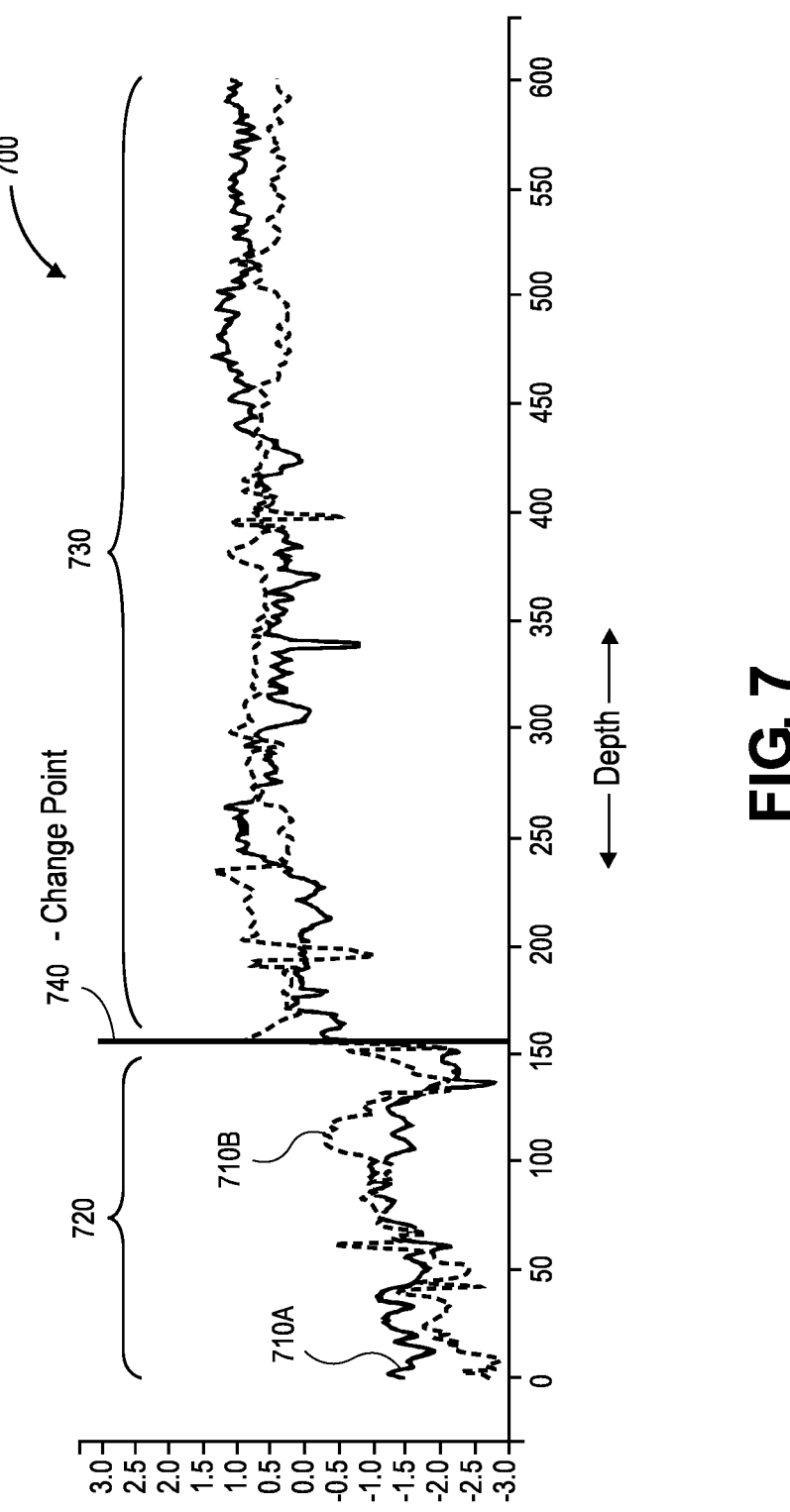
FIG. 7 illustrates an example of a well log including beginning portions of two (e.g., simultaneous) signals, according to an embodiment.
Figure 8A:
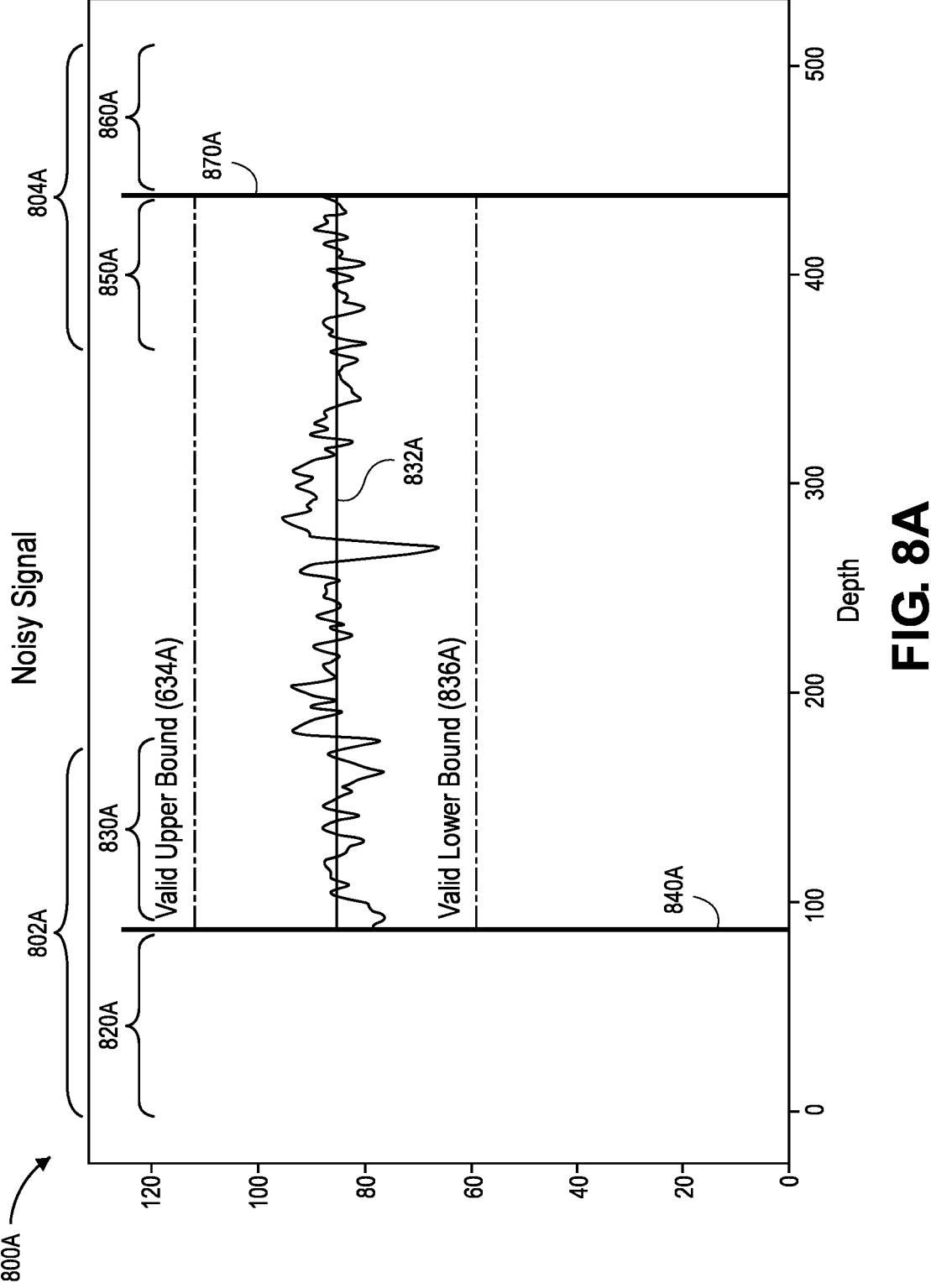
FIG. 8A illustrates a modified well log (e.g., a modified version of the well log in FIG. 6A) in which aberrant (e.g., inconsistent) signal regions of the signal have been removed, according to an embodiment.
Figure 8B:
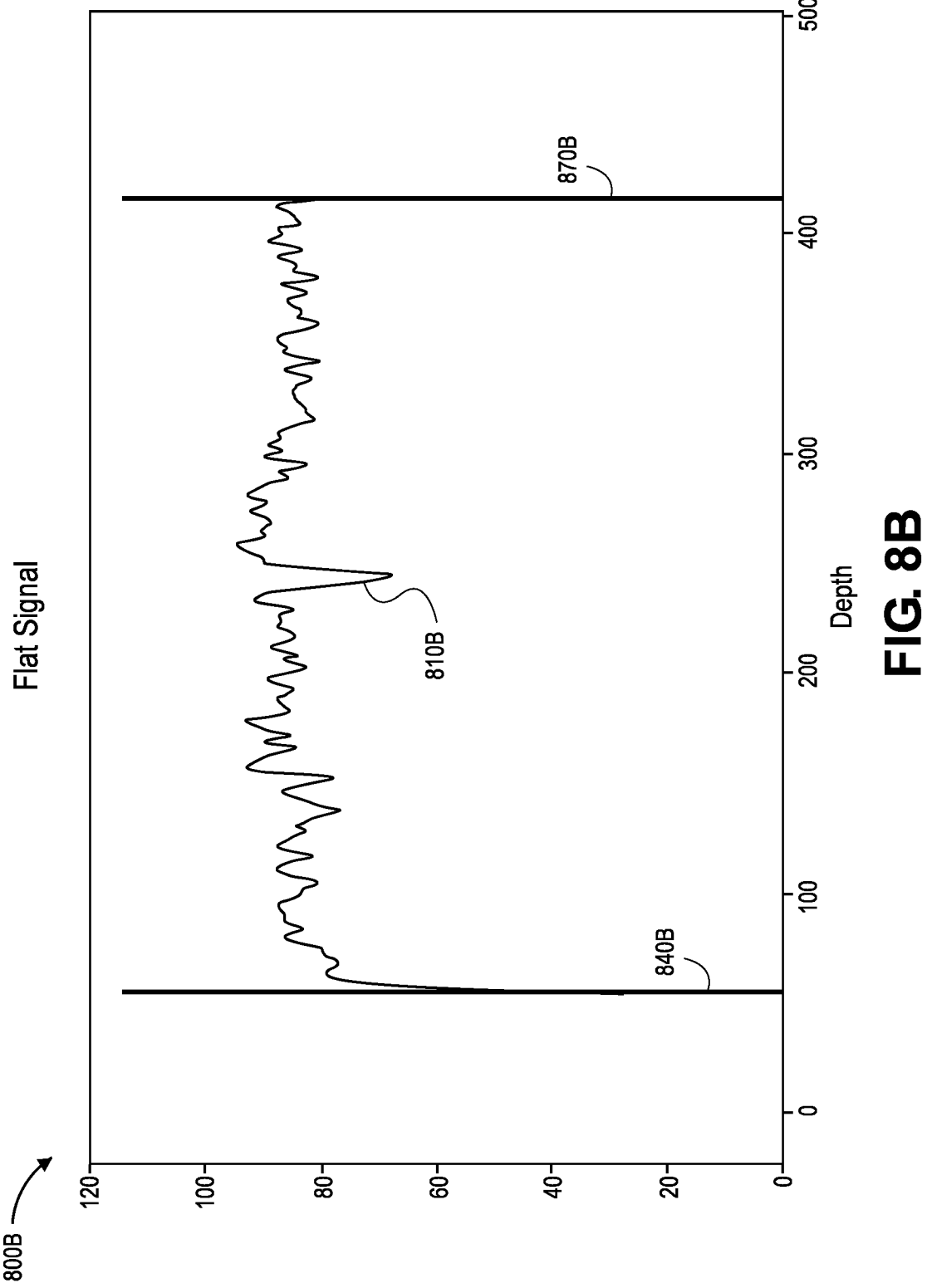
FIG. 8B illustrates a modified well log (e.g., a modified version of the well log in FIG. 6B) in which aberrant (e.g., constant) signal regions of the signal have been removed, according to an embodiment.

FIG. 7 illustrates an example of a well log 700 including beginning portions 702 of two (e.g., simultaneous) signals 710A, 710B, according to an embodiment. The first signal region 720 is from about 0 m to about 155 m, the change point 740 exists at about 155 m, and the second signal region 730 is from about 155 m to about 600 m.

The method 500 may also include producing a modified well log, as at 510. FIG. 8A illustrates a modified well log 800A (e.g., a modified version of the well log 600A in FIG. 6A), according to an embodiment. In one embodiment, the modified well log 800A may be produced by removing the first signal region 620A from the signal 610A in response to determining that the first signal region 620A is inconsistent in comparison to the second signal region 630A. In the modified well log 800A, the first signal region 620A of the signal 610A (e.g., from a depth of about 0 m to about 90 m) has been removed.

Detection of Constant/Straight Lines

To illustrate this portion of the method 500, FIG. 6B illustrates another well log 600B including another (e.g., different) signal 610B, and FIG. 6C illustrates a derivative signal 610C (e.g., a derivative of the signal 610B), according to an embodiment. However, as mentioned above, this portion of the method 500 may also or instead be performed on the signal 610A in the well log 600A.

The method 500 may also include producing a derivative signal 610C by calculating a derivative of at least a portion of the signal 610B, as at 512. The method 500 may also include identifying a second change point 640C in the derivative signal 610C, as at 514. The second change point 640C may be identified in a beginning portion 602C of the of the derivative signal 610C. The second change point 640C may demarcate a third signal region 620C before/ above the second change point 640C and a fourth signal region 630C after/below the second change point 640C. In this example, the third signal region 620C may represent a depth from about 0 m to about 70 m, the second change point 640C may represent a depth of about 70 m, and the fourth signal region 630C may represent a depth from a depth from about 70 m to about 120 m. The second change point 640C may be determined using a change point detection algorithm (e.g., the same algorithm used above).

The method 500 may also include determining that the third signal region 620C has a value of substantially zero, as at 516. The value that is substantially zero may be or include the amplitude (e.g., on the Y-axis). For example, as used herein, the term "substantially zero" may refer to an amplitude that is within the range of −2 and 2 or within the range of −1 and 1. The value that is substantially zero may also or instead be the slope. Thus, as shown in FIG. 6C, the third signal region 620C may be substantially horizontal. In at least one embodiment, the third signal region 620C of the derivative signal 610C may include a value of substantially zero in response to the following:

$$\sigma(y'_{0:k^*}) < \epsilon \qquad \text{Equation 9}$$

where $\sigma(y'_{0:k}*)$ is the empirical standard deviation of the third signal region 620C in the derivative signal 610C (e.g., from 0 to k*), and $\epsilon$ is a user input scalar (e.g., set to a small value such as 1e−3 or 1e−5). The third signal region 620C of the derivative signal 610C having a value of substantially zero may indicate that the corresponding third signal region 620B (e.g., from a depth of about 0 m to about 70 m) in the original signal 610B (see FIG. 6B) includes a constant (e.g., straight-line) 622B. This is because the derivative of a constant is zero. The third signal region 620B of the original signal 610B including the constant (e.g., straight-line) 622B may indicate that the third signal region 620B of the original signal 610B contains an anomaly or is otherwise inaccurate.

The method 500 may also include producing a modified well log, as at 518. FIG. 8B illustrates a modified well log 800B (e.g., a modified version of the well log 600B in FIG. 6B), according to an embodiment. In one embodiment, the modified well log 800B may be produced by removing the third signal region 620B (e.g., from about 0 m to about 70 m) from the signal 610B in response to determining that the third signal region 620C of the derivative signal 610C has a value of substantially zero. As mentioned above, this portion of the method 500 is illustrated using a different well log 600B and a different modified well log 800B for clarity; however, in other embodiments, this portion of the method 500 may also or instead be performed using the well log 600A and/or the modified well log 800A. Thus, this step may also or instead be directed to adjusting the modified well log 800A.

Second (e.g., End) Portion of the Signal

Referring back to FIGS. 5 and 6A, one or more portions of the method 500 may be repeated for the second (e.g., end) portion 604A of the signal 610A. For example, the method 500 may also include selecting the second (e.g., end) portion 604A of the signal 610A in the well log 600A, as at 520. This may include selecting the last n samples (e.g., the last 500 samples) of the signal 610A. Referring again to FIG. 6A, the end portion 604A may represent a depth range (e.g., from about 380 m to about 500 m). In an example, the samples may be spaced apart by about 15 cm.

The method 500 may also include identifying a third change point 670A in the signal 610A, as at 522. The third change point 670A may be identified in the end portion 604A of the signal 610A. As may be seen in FIG. 6A, the third change point 670A may demarcate a fifth signal region 650A before/above the third change point 670A and a sixth signal region 660A after/below the third change point 670A. In this particular example, the fifth signal region 650A represents a depth from about 380 m to about 430 m, the third change point 670A represents a depth of about 430 m, and the sixth signal region 660A represents a depth from about 430 m to about 500 m. In at least one embodiment, the third change point 670A may be determined using a change point detection algorithm (e.g., the same algorithm discussed above).

The method 500 may also include determining that the sixth signal region 660A is inconsistent in comparison with the fifth signal region 650A, as at 524. This may also or instead include determining that the sixth signal region 660A is noisy in comparison to the fifth signal region 650A.

The sixth signal region 660A (e.g., samples k* to n in the signal 610A) is determined to be inconsistent with respect to the fifth signal region 650A (e.g., samples from 0 to k* in the signal 610A) in response to one or both of the following:

$$\bar{y}_{k^*:n} < \bar{y}_{0:k^*} - m * \sigma(y_{0:k^*}) \qquad \text{Equation 10}$$

$$\bar{y}_{k^*:n} > \bar{y}_{0:k^*} + m * \sigma(y_{0:k^*}) \qquad \text{Equation 11}$$

In other words, Equation 10 states that the sixth signal region 660A is inconsistent in response to a mean 662A of the sixth signal region 660A being less than a mean 632A of the fifth signal region 650A minus a product. The product is the user input (e.g., 3) multiplied by the empirical standard deviation of the fifth signal region 650A. Equation 11 states that the sixth signal region 660A is inconsistent in response to the mean 662A of the sixth signal region 660A being less than the mean 632A of the fifth signal region 650A plus the product.

The method 500 may also include adjusting the modified well log 800A, as at 526. In one embodiment, the modified well log 800 may be adjusted by removing the sixth signal region 660A from the signal 610A in response to determining that the sixth signal region 660A is inconsistent in comparison to the fifth signal region 650A.

The method 500 may also include identifying a fourth change point 670C in the derivative signal 610C, as at 528. As shown in FIG. 6C, the fourth change point 670C may be identified in an end portion 604C of the of the derivative signal 610C. The fourth change point 670C may demarcate a seventh signal region 650C before/above the fourth change point 670C and an eighth signal region 660C after/below the fourth change point 670C. In this particular example, the seventh signal region 650C represents a depth from about 380 m to about 430 m, the fourth change point 670C exists at a depth of about 430 m, and the eighth signal region 660C represents a depth from about 430 m to about 500 m. In at least one embodiment, the fourth change point 670C may be determined using a change point detection algorithm (e.g., the same algorithm discussed above).

The method 500 may also include determining that the eighth signal region 660C has a value of substantially zero, as at 530. The eighth signal region 660C is determined to have a value of substantially zero in response to the following:

$$\sigma(y'_{k^*:n}) < \epsilon \qquad \text{Equation 12}$$

where $\sigma(y'_{k^*:n})$ is the empirical standard deviation of the eighth signal region 660C of the derivative signal 610C (e.g., from k* to n). The eighth signal region 660C of the derivative signal 610C having a value of substantially zero may indicate that the corresponding eighth signal region 6b0B (e.g., from a depth of about 430 m to about 500 m) in the original signal 610B (see FIG. 6B) includes a constant (e.g., straight-line) 662B. This is because the derivative of a constant is zero. The eighth signal region 660B of the original signal 610B including the constant (e.g., straight-line) 662B may indicate that the eighth signal region 660B of the original signal 610B contains an anomaly or is otherwise inaccurate.

The method 500 may also include adjusting the modified well log 800B, as at 532. In one embodiment, the modified well log 800B may adjusted by removing the eighth signal region 660B (e.g., from about 430 m to about 500 m) from the signal 610B in response to determining that the eighth signal region 660C of the derivative signal 610C has a value that is substantially zero.

In response to the modified well log 800A, 800B, one or more wellsite actions may occur. In one embodiment, the wellsite actions may be or include varying a drilling plan for the current wellbore or future wellbores. The drilling plan may be or include the location and/or trajectory. The wellsite action may also or instead include transmitting a signal (e.g., from the computing system) to steer the downhole tool, vary the weight on the bit (WOB), vary the drilling fluids pumped into the wellbore, vary the composition of the drilling fluids pumped into the wellbore, or a combination thereof.

Wellbore Data Depth Matching Using Change Point Algorithms

Figure 9:
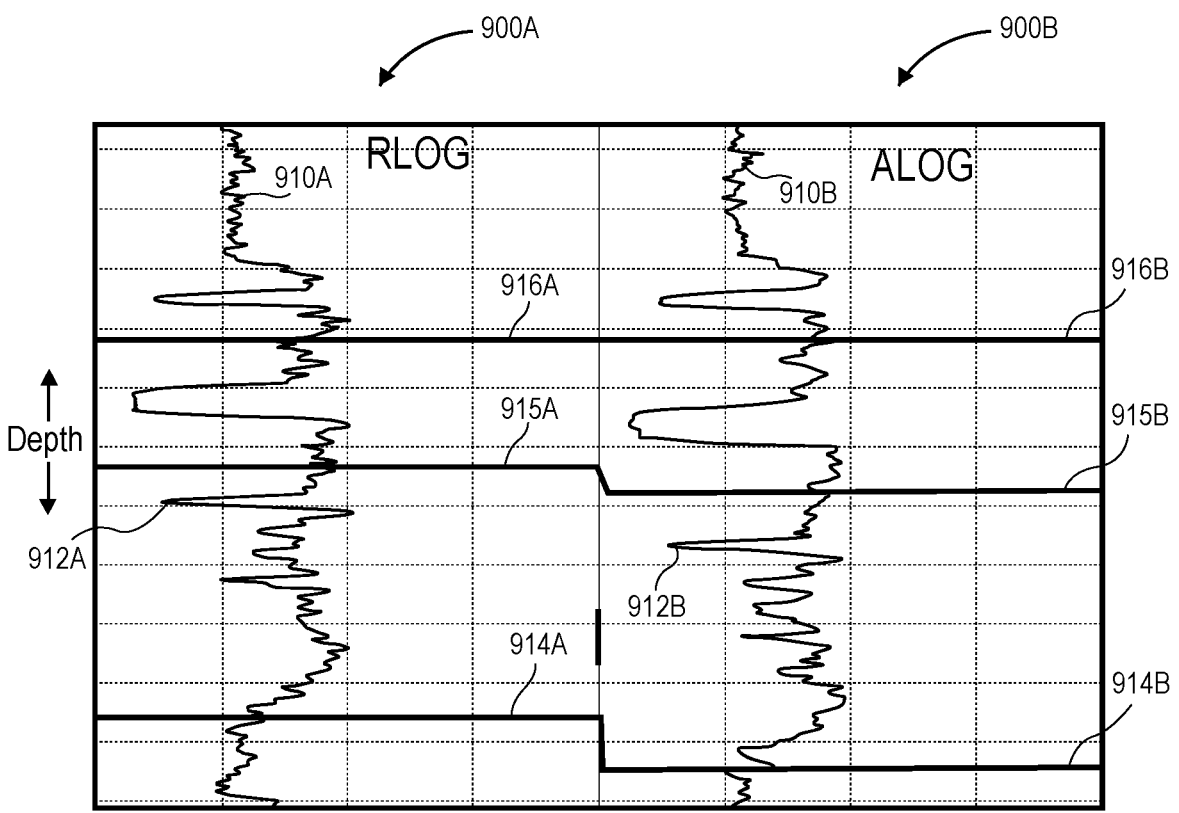
FIG. 9 illustrates an example of a first well log and a second well log, according to an embodiment.

FIG. 9 illustrates an example of a first well log 900A and a second well log 900B, according to an embodiment. Although not shown, in at least one embodiment, the first well log 900A and/or the second well log 900B may be or include the well log 600A described above (e.g., either before or after the method 500 has been performed).

The first and second well logs 900A, 900B may be captured by any of the tools 106.1-106.4 and/or the tools 202.1-202.4 described above. The first and second well logs 900A, 900B may be captured in the same wellbore or in two different wellbores. The first and second well logs 900A, 900B may be captured in the same run or in two different runs. The first well log 900A may be captured before, simultaneously with, or after the second well log 900B. The first and second well logs 900A, 900B may be the same type of well log or different types of well logs. For example, the first well log 900A, the second well log 900B, or both may be or include gamma ray logs, resistivity logs, sonic logs, neutron logs, density logs, pressure logs, temperature logs, or the like.

In the embodiment shown, the first and second well logs 900A, 900B may include similar data (e.g., signals) 910A, 910B; however, the signals 910A, 910B in the first and second well logs 900A, 900B may be at least partially offset from one another with respect to depth. As an illustrative example, the first and second signals 910A, 910B may each include peaks 912A, 912B that correspond to the same portion of the subterranean formation (e.g., the same reservoir or fault); however, the peaks 912A, 912B are shown at different depths.

FIG. 10 illustrates a flowchart of a method 1000 for aligning (e.g., depth-matching) the signals 910A, 910B in the first and second well logs 900A, 900B, according to an embodiment. An illustrative order of the method 1000 is provided below; however, one or more portions of the method 1000 may be performed in a different order, performed simultaneously, repeated, or omitted. In at least one embodiment, the method 500 may be applied to one or both of the well logs 900A, 900B prior to one or more portions of the method 1000 being performed. In another embodiment, the method 500 may be applied to one or both of the well logs 900A, 900B after one or more portions of the method 1000 are performed.

The method 1000 may include receiving the first well log 900A and the second well log 900B, as at 1002. If the first well log 900A has already been received (e.g., at 502), this may include receiving the second well log 900B. In this method 1000, the second well log 900B may be modified to become aligned with the first well log 900A. For example, the second well log 900B may be modified such that the peaks (e.g., peak 912B) become located at the same depth as the corresponding peaks (e.g., peak 912A) in the first well log 900A. Thus, the first well log 900A may serve as a reference well log.

The method 1000 may also include identifying one or more change points (also referred to as anchors) in the first well log 900A and one or more change points in the second well log 900B, as at 1004. As shown in FIG. 9, the signal 910A in the first well log 900A includes one or more change points (three are shown: 914A-916A), and the signal 910B in the second well log 900B includes one or more corresponding change points (three are shown: 914B-916B).

In one embodiment, a change point detection algorithm may be applied to the first well log 900A and the second well log 900B to identify the change points 914A-916A, 914B-916B. The change point detection algorithm may be the same algorithm described above with reference to FIG. 5, or it may be a different algorithm. By using the change point detection algorithm (e.g., a binary segmentation algorithm), a predetermined number of change points 914A-916A, 914B-916B may be identified. A plurality of change points 914A-916A, 914B-916B may be identified to avoid large stretches of the signal.

The change points 914A, 914B may correspond to the same portion of the subterranean formation (e.g., a change in the subterranean formation), the change points 915A, 915B may correspond to the same portion of the subterranean formation (e.g., the same reservoir or fault), and the change points 916A, 916B may correspond to the same portion of the subterranean formation (e.g., the same reservoir or fault). As may be seen, the change points 916A, 916B are located at substantially the same depth; however, the change points 914A, 914B and the change points 915A, 915B are located at different depths. The following portions of the method 1000 may thus include modifying the signal 910B in the second well log 900B so that the change points 914B-916B in the signal 910B in the second well log 900B become aligned with the change points 914A-916A in the signal 910A in the first well log 900A.

The method 1000 may also include selecting a second change point 914B of the one or more change points 914B-916B in the second well log 900B based at least partially upon a proximity in depth to a first change point 914A of the one or more change points 914A-916A in the first well log 900A, as at 1006. In one embodiment, the phrase "based at least partially upon a proximity in depth" may refer to being the closest in depth. For example, the change point 914B is closer in depth than the change points 915B, 916B to the change point 914A. In at least one embodiment, portion of the method 1000 may be performed in reverse by identifying a first change point 914A of the one or more change points 914A-916A in the first well log 900A based at least partially upon a proximity in depth to a second change point 914B of the one or more change points 914B-916B in the second well log 900B.

This may be done for each of the change points 914A-916A in the first well log 900A. This may also or instead be done for each of the change points 914B-916B in the second well log 900B. For example, the change point 914B in the second well log 900B is determined to be closest in depth to the change point 914A in the first well log 900A, the change point 915B in the second well log 900B is determined to be closest in depth to the change point 915A in the first well log 900A, and the change point 916B in the second well log 900B determined to be closest in depth to the change point 916A in the first well log 900A.

Figure 11:
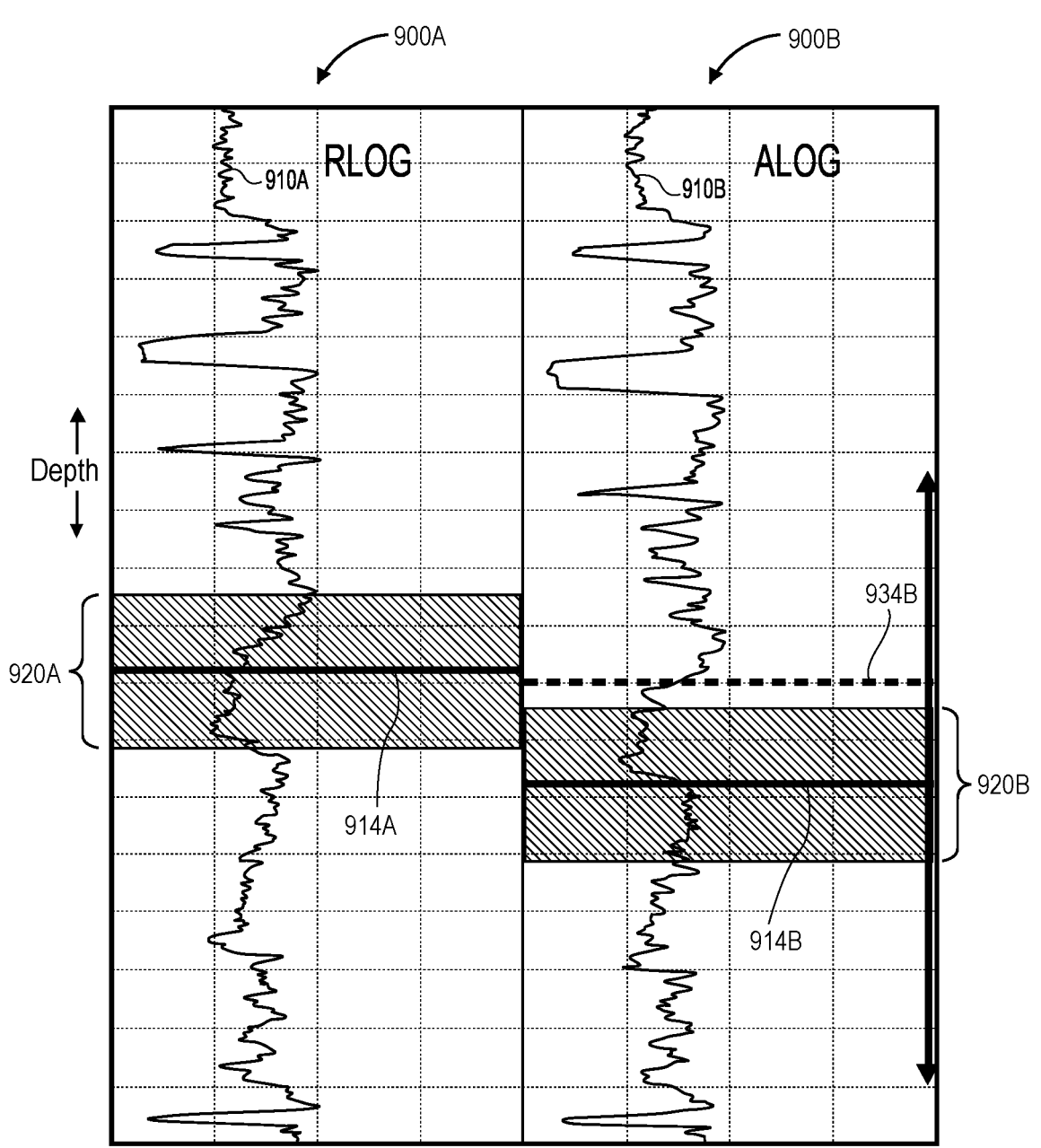
FIG. 11 illustrates a first window in the first well log, and a second window in the second well log, according to an embodiment.

The method 1000 may also include positioning a first window 920A at a first location within the first well log 900A, as at 1008. FIG. 11 illustrates a first window 920A in the first well log 900A, and a second window 920B in the second well log 900B, according to an embodiment. The windows 920A, 920B in the example in FIG. 11 are positioned proximate to the change points 914A, 914B, respectively. The size (e.g., depth) of the windows 920A, 920B may be selected by a user. For example, the size of the windows 920A, 920B may be 50 meters.

The change point 914A may be within the first window 920A when the first window 920A is positioned at the first location. For example, the change point 914A may be centered within the first window 920A when the first window 920A is positioned at the first location.

The method 1000 may also include positioning a second window 920B at a second location within the second well log 900B, as at 1010. The second location may be based at least partially upon the change point 914B.

The method 1000 may also include determining a first similarity value between the signal 910A in the first window 920A at the first location and the signal 910B in the second window 920B at the second location, as at 1012. In other words, the first window 920A may be positioned at the first location during the determination of the similarity values, and the second window 920B may be positioned at the second location during the determination of the first similarity value.

The method 1000 may also include repositioning the second window 920B at a third location within the second well log 900B, as at 1014. Thus, the second window 920B may be a sliding window that may be moved up and/or down to determine the location with the highest similarity value, as described below. The third location may be based at least partially upon the change point 914B. The different locations (e.g., the second location, the third location, etc.) may be or include different depths. The second location may be above or below the third location. The second window 920B in the second location may at least partially overlap the second window 920B in the third location, or there may be no overlap. The different locations (e.g., different depths) may be within a predetermined range determined by a user. For example, the second window 920B may move up and/or down +/−100 m with respect to the change point 914B.

In one embodiment, the change point 914B may be within the second window 920B when the second window 920B is positioned at one or more of the plurality of different locations. For example, the change point 914B may be centered within the second window 920B at a first of the locations, and the change point 914B may be in an upper portion (or lower portion) of the second window 920B at a second of the locations. In another embodiment, the change point 914B may be outside of the second window 920B when the second window 920B is positioned at one or more of the plurality of different locations.

The method 1000 may also include determining a second similarity value between the signal 910A in the first window 920A at the first location and the signal 910B in the second window 920B at the third location, as at 1016. In other words, the first window 920A may remain positioned at the first location during the determination of the similarity values, and the second window 920B may be positioned at the third location during the determination of the second similarity value. The similarity values may be determined by comparing a subsequence of n samples (e.g., 50 samples) of the portion of the signal 910A in the first window 920A to a subsequence of n samples of the portion of the signal 910B in the second window 920B. As will be appreciated, the second window 920B may be positioned at more than two locations, and in this instance, more than two similarity values may be determined.

The method 1000 may also include selecting the second location or the third location of the second window 920B, as at 1018. The selected location may be based at least partially upon the similarity values. For example, this may include selecting the location of the second window 920B having the highest similarity value. In FIG. 11, the line 934B represents a center of the second window 920B when the second window 920B is at the location with the highest similarity value. In other words, at this location, the signal 910B in the second window 920B is most similar to the signal 910A in the first window 920A.

The method 1000 may also include determining a modified second change point 934B, as at 1020. The modified second change point 934B may also or instead be referred to as an anchor because it may not be determined using a change point algorithm. The modified second change point 934 may be determined based at least partially upon one or more of the similarity values (e.g., determined at 1012 and 1014), the selected location (e.g., determined at 1016), or a combination thereof. The modified second change point 934 may correspond to the first change point 914A better than the second change point 914B corresponds to the first change point 914A.

Figure 12:
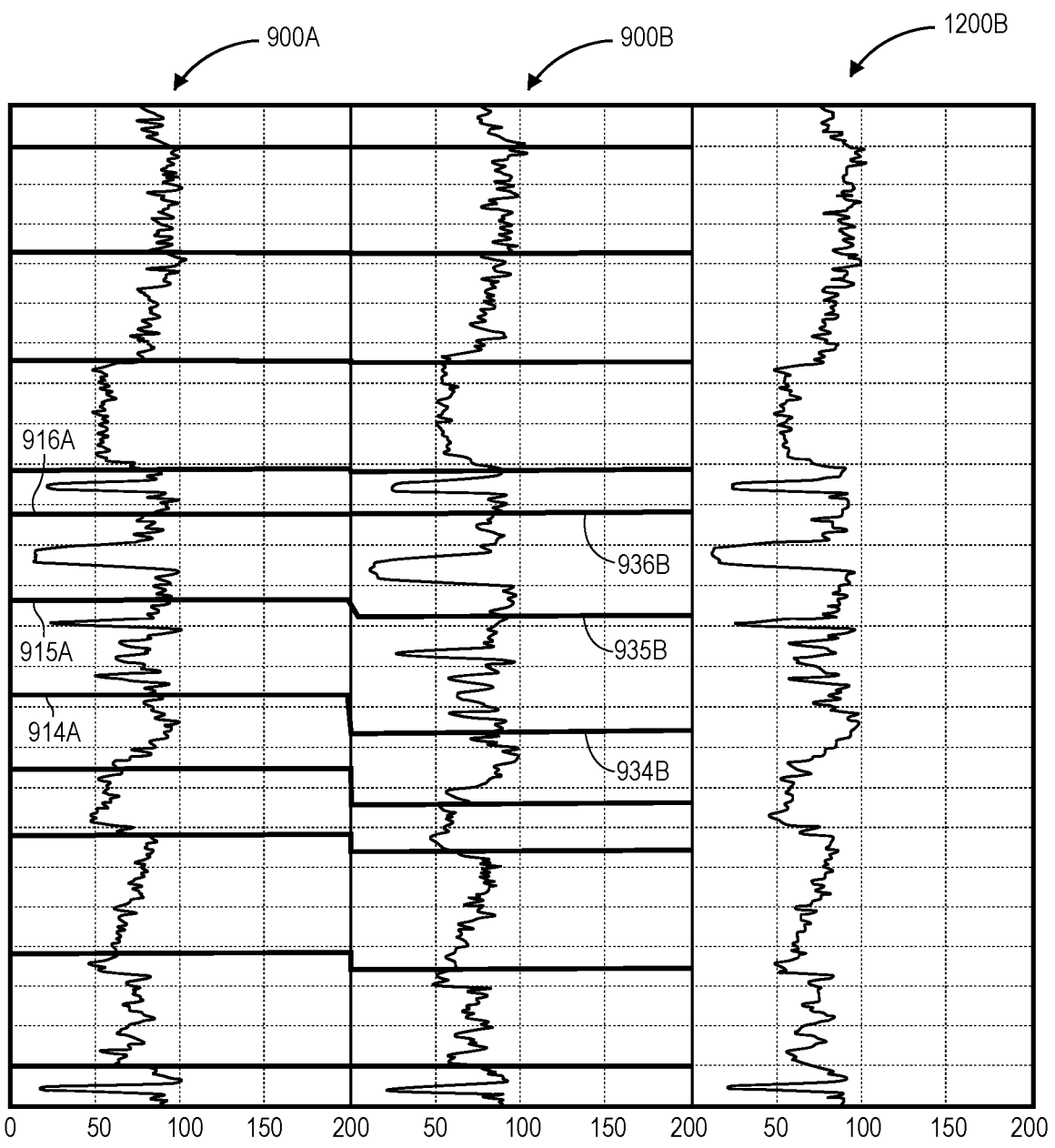
FIG. 12 illustrates the first well log, the second well log, and a modified second well log, according to an embodiment.

The method 1000 may also include producing a modified second well log 1200B, as at 1022. FIG. 12 illustrates the first well log 900A, the second well log 900B, and the modified second well log 1200B, according to an embodiment. The modified second well log 1200B may be produced based at least partially upon one or more of the similarity values (e.g., determined at 1012 and 1014), the selected location (e.g., determined at 1016), the modified second change point 934B (e.g., determined at 1018), or a combination thereof.

In one embodiment, modifying the second well log 900B to produce the modified second well log 1200B may include determining differences between the depths in the first well log 900A and the corresponding depths in the second well log 900B and/or the modified second well log 1200B, and then applying an outlier detection algorithm to remove the possible aberrant depth shifts therebetween. Thus, modifying the second well log 900B may include shifting one or more portions of the second well log 900B (e.g., the signal 910B) up or down. Modifying the second well log 900B may also or instead include stretching or compressing one or more portions of the second well log 900B (e.g., the signal 910B). As may be seen, the modified second well log 1200B is better aligned with the first well log 900A than the second well log 900B is with the first well log 900A.

Table 1 below provides an example of modified change points. More particularly, the left column represents the depth of the change points (e.g., change points 914A-916A) in the first (i.e., reference) well log 900A. The middle column represents the depth of the modified change points (e.g., modified change point 934B). The right column represents the difference in depth between the left column and the middle column. The repeated values of the depth difference provide confidence in the alignment of the change points in the first well log 900A and the corresponding modified second well log 1200B.

TABLE 1

| Change Point Depth in 1st Well Log 900A | Modified Second Change Point Depth in 2nd Well Log 900B | Depth Difference |
|---|---|---|
| 3500.0 | 3500.0 | 0.0 |
| 3517.5 | 3520.5 | −3.0 |
| 3620.0 | 3625.5 | −5.5 |
| 3625.0 | 3630.5 | −5.5 |
| 3677.5 | 3678.0 | −0.5 |
| 3682.5 | 3682.0 | 0.5 |
| 3687.5 | 3687.0 | 0.5 |
| 3690.0 | 3689.5 | 0.5 |
| 3692.5 | 3692.0 | 0.5 |
| 3695.0 | 3694.5 | 0.5 |
| 3725.0 | 3718.0 | 7.0 |
| 3727.5 | 3719.5 | 8.0 |
| 3730.0 | 3722.0 | 8.0 |
| 3737.5 | 3729.5 | 8.0 |
| 3740.0 | 3732.0 | 8.0 |
| 3742.5 | 3734.0 | 8.5 |

TABLE 1-continued

| Change Point Depth in 1st Well Log 900A | Modified Second Change Point Depth in 2nd Well Log 900B | Depth Difference |
|---|---|---|
| 3772.5 | 3757.5 | 15.0 |
| 3830.0 | 3812.0 | 18.0 |
| 3840.0 | 3825.5 | 14.5 |
| 3842.5 | 3828.0 | 14.5 |
| 3850.0 | 3835.5 | 14.5 |
| 3865.0 | 3853.0 | 12.0 |
| 3872.5 | 3860.5 | 12.0 |
| 3877.5 | 3865.5 | 12.0 |

One or more portions (e.g., 1006-1020) of the method 1000 may be repeated (e.g., for each change point 915B, 916B, etc.) in the second well log 900B to adjust the modified second well log 1200B.

In response to the modified second well log 1200B, one or more wellsite actions may occur. In one embodiment, the wellsite actions may be or include varying a drilling plan for the current wellbore or future wellbores. The drilling plan may be or include the location and/or trajectory. The wellsite action may also or instead include transmitting a signal (e.g., from the computing system) to steer the downhole tool, vary the weight on the bit (WOB), vary the drilling fluids pumped into the wellbore, vary the composition of the drilling fluids pumped into the wellbore, or a combination thereof.

Figure 13A:
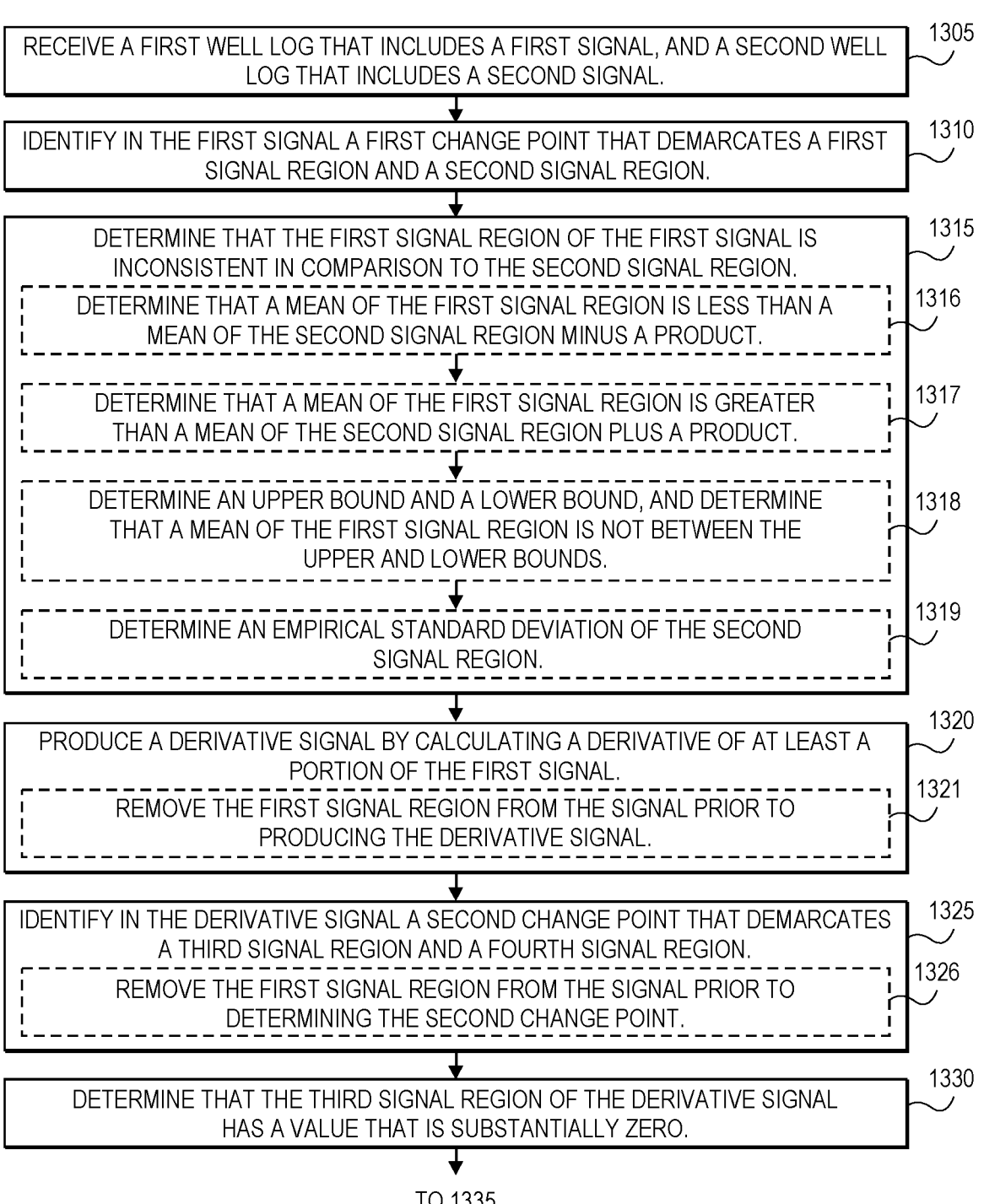

FIG. 13 illustrates a flowchart of a method 1300, according to an embodiment. An illustrative order of the method 1300 is provided below; however, one or more portions of the method 1300 may be performed in a different order, performed simultaneously, repeated, or omitted.

The method 1300 may include receiving a first well log that includes a first signal, and a second well log that includes a second signal, as at 1305 (e.g., FIG. 10, 1002).

The method 1300 may also include identifying in the first signal a first change point that demarcates a first signal region and a second signal region, as at 1310 (e.g., FIG. 5, 506).

The method 1300 may also include determining that the first signal region of the first signal is inconsistent in comparison to the second signal region, as at 1315 (e.g., FIG. 5, 508).

Determining that the first signal region of the first signal is inconsistent may include determining that a mean of the first signal region is less than a mean of the second signal region minus a product, as at 1316.

Determining that the first signal region of the first signal is inconsistent may include determining that a mean of the first signal region is greater than a mean of the second signal region plus a product, as at 1317.

Determining that the first signal region is inconsistent may include determining an upper bound and a lower bound, and determining that a mean of the first signal region is not between the upper and lower bounds, as at 1318.

Determining that the first signal region is inconsistent may include determining an empirical standard deviation of the second signal region, as at 1319.

The method 1300 may also include producing a derivative signal by calculating a derivative of at least a portion of the first signal, as at 1320 (e.g., FIG. 5, 512).

The method 1300 may also include removing the first signal region from the signal prior to producing the derivative signal, as at 1321.

The method 1300 may also include identifying in the derivative signal a second change point that demarcates a third signal region and a fourth signal region, as at 1325 (e.g., FIG. 5, 514).

The method 1300 may also include removing the first signal region from the signal prior to determining the second change point, as at 1326.

The method 1300 may also include determining that the third signal region of the derivative signal has a value that is substantially zero, as at 1330 (e.g., FIG. 5, 516).

The method 1300 may also include producing a modified first well log, as at 1335 (e.g., FIG. 5, 510, 518).

The method 1300 may also include identifying in a second portion of the signal a third change point that demarcates a fifth signal region and a sixth signal region, as at 1336 (e.g., FIG. 5, 522).

The method 1300 may also include determining that the sixth signal region of the signal is inconsistent in comparison to the fifth signal region, as at 1337 (e.g., FIG. 5, 524).

The method 1300 may also include adjusting the modified well log by removing the sixth signal region from the signal, as at 1338 (e.g., FIG. 5, 526).

The method 1300 may also include identifying in a second portion of the derivative signal a fourth change point that demarcates a seventh signal region and an eighth signal region, as at 1339 (e.g., FIG. 5, 528).

The method 1300 may also include determining that the eighth signal region of the derivative signal has a value that is substantially zero, as at 1340 (e.g., FIG. 5, 530).

The method 1300 may also include adjusting the modified well log by removing the eighth signal region from the signal, as at 1341 (e.g., FIG. 5, 531).

The method 1300 may also include selecting a fifth change point in the modified first well log and a sixth change point in the second well log, as at 1345 (e.g., FIG. 10, 1006).

The method 1300 may also include positioning a first window within the modified first well log based at least in part on the fifth change point, as at 1350 (e.g., FIG. 10, 1008).

The method 1300 may also include positioning a second window at a first location within the second well log based at least in part on the sixth change point, as at 1355 (e.g., FIG. 10, 1010).

The method 1300 may also include determining a first similarity value between the first signal in the first window and the second signal in the second window at the first location, as at 1360 (e.g., FIG. 10, 1012).

The method 1300 may also include repositioning the second window at a second location within the second well log based at least in part on the sixth change point, as at 1365 (e.g., FIG. 10, 1014).

The method 1300 may also include determining a second similarity value between the first signal in the first window and the second signal in the second window at the second location, as at 1370 (e.g., FIG. 10, 1016).

The method 1300 may also include selecting the first location or the second location of the second window based at least partially upon the first and second similarity values, as at 1375 (e.g., FIG. 10, 1018).

The method 1300 may also include determining a modified fourth change point based at least partially upon the selected first location or second location of the second window, as at 1380 (e.g., FIG. 10, 1020).

The method 1300 may also include producing a modified second well log based at least partially upon the selected first location or second location of the second window, as at 1385 (e.g., FIG. 10, 1022).

Producing the modified second well log may include determining a difference between the depth represented by the first change point and a depth represented by the modified second change point, and applying an outlier detection algorithm to remove the difference, as at 1386.

One or more portions of the method(s) 400, 500, 1000, 1300 disclosed herein may be performed by a computing system, in order to improve the functioning of the computing system (e.g., for seismic processing purposes). In one embodiment, the computing system may include a processor and a memory system including a non-transitory computer-readable medium storing instructions that, when executed by the processor, cause the computing system to perform operations. The operations may include receiving a first well log having a first signal, and a second well log having a second signal. The operations may also include identifying in the first signal a first change point that demarcates a first signal region and a second signal region. The operations may also include determining that the first signal region of the first signal is inconsistent in comparison to the second signal region. The operations may also include producing a derivative signal by calculating a derivative of at least a portion of the first signal. The operations may also include identifying in the derivative signal a second change point that demarcates a third signal region and a fourth signal region. The operations may also include determining that the third signal region of the derivative signal has a value that is substantially zero. The operations may also include producing a modified first well log by removing the first signal region from the first signal in response to determining that the first signal region of the signal is inconsistent in comparison to the second signal region, and by removing the third signal region from the first signal in response to determining that the third signal region of the derivative signal has the value that is substantially zero. The operations may also include selecting a third change point in the modified first well log and a fourth change point in the second well log. The operations may also include positioning a first window within the modified first well log based at least in part on the third change point. The operations may also include positioning a second window at a first location within the second well log based at least in part on the fourth change point. The operations may also include determining a first similarity value between the first signal in the first window and the second signal in the second window at the first location. The operations may also include repositioning the second window at a second location within the second well log based at least in part on the fourth change point. The operations may also include determining a second similarity value between the first signal in the first window and the second signal in the second window at the second location. The operations may also include selecting the first location or the second location of the second window based at least partially upon the first and second similarity values. The operations may also include producing a modified second well log based at least partially upon the selected first location or second location of the second window.

Embodiments of the present disclosure may also provide another computing system. The computing system may include a processor and a memory system including a non-transitory computer-readable medium storing instructions that, when executed by the processor, cause the computing system to perform operations. The operations may include receiving a well log having a signal. The operations may also include identifying in the signal a first change point that demarcates a first signal region and a second signal region. The operations may also include determining that the first signal region is inconsistent in comparison to the second signal region. The operations may also include producing a modified well log by removing the first signal region from the signal in response to determining that the first signal region is inconsistent in comparison to the second signal region.

Embodiments of the present disclosure may also provide another computing system. The computing system may include a processor and a memory system including a non-transitory computer-readable medium storing instructions that, when executed by the processor, cause the computing system to perform operations. The operations may include receiving a first well log and a second well log. The first well log includes a first signal, and the second well log includes a second signal. The operations may also include selecting a second change point in the second well log. The second change point represents a depth in the second well log. The second change point is selected based on a proximity to a depth represented by a first change point in the first well log. The operations may also include positioning a first window in the first well log based at least in part on the first change point. The operations may also include positioning a second window at a first location in the second well log based at least in part on the second change point. The operations may also include determining a first similarity value between the first signal in the first window and the second signal in the second window at the first location. The operations may also include repositioning the second window at a second location in the second well log based at least in part on the second change point. The operations may also include determining a second similarity value between the first signal in the first window and the second signal in the second window at the second location. The operations may also include selecting the first location or the second location of the second window based at least partially upon the first and second similarity values. The operations may also include determining a modified second change point based at least partially upon the selected first location or second location of the second window. The operations may also include producing a modified second well log based at least partially upon the modified second change point.

Figure 14:
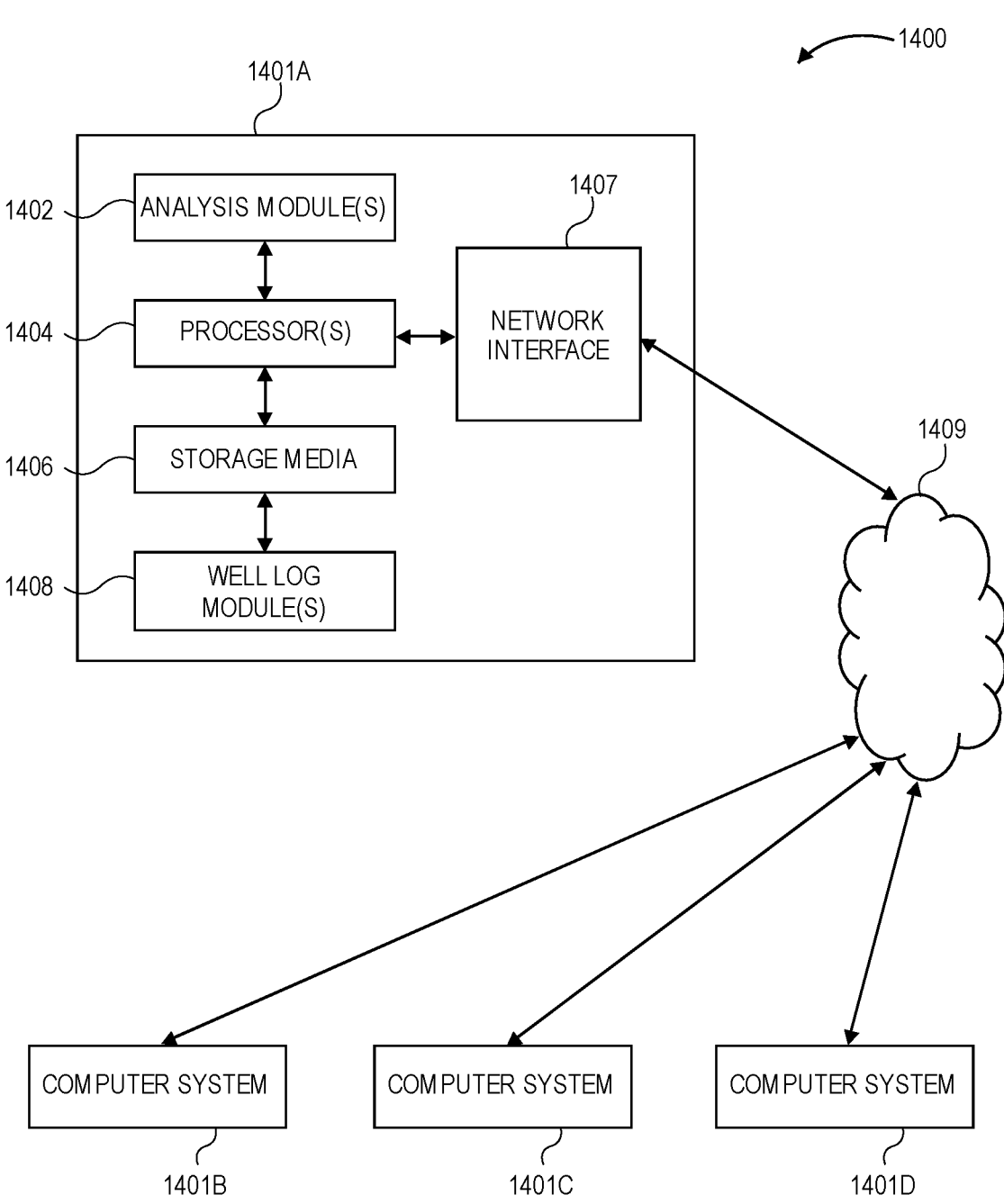
FIG. 14 illustrates a computing system for performing at least a portion of the method(s) disclosed herein, according to an embodiment.

In some embodiments, any of the methods 400, 500, 1000, 1300 of the present disclosure may be executed by a computing system. FIG. 14 illustrates an example of such a computing system 1400, in accordance with some embodiments. The computing system 1400 may include a computer or computer system 1401A, which may be an individual computer system 1401A or an arrangement of distributed computer systems. The computer system 1401A includes one or more analysis module(s) 1402 configured to perform various tasks according to some embodiments, such as one or more methods disclosed herein. To perform these various tasks, the analysis module 1402 executes independently, or in coordination with, one or more processors 1404, which is (or are) connected to one or more storage media 1406. The processor(s) 1404 is (or are) also connected to a network interface 1407 to allow the computer system 1401A to communicate over a data network 1409 with one or more additional computer systems and/or computing systems, such as 1401B, 1401C, and/or 1401D (note that computer systems 1401B, 1401C and/or 1401D may or may not share the same architecture as computer system 1401A, and may be located in different physical locations, e.g., computer systems 1401A and 1401B may be located in a processing facility, while in communication with one or more computer systems such as 1401C and/or 1401D that are located in one or more data centers, and/or located in varying countries on different continents).

A processor can include a microprocessor, microcontroller, processor module or subsystem, programmable integrated circuit, programmable gate array, or another control or computing device.

The storage media 1406 can be implemented as one or more computer-readable or machine-readable storage media. Note that while in the example embodiment of FIG. 14 storage media 1406 is depicted as within computer system 1401A, in some embodiments, storage media 1406 may be distributed within and/or across multiple internal and/or external enclosures of computing system 1401A and/or additional computing systems. Storage media 1406 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 1400 contains one or more well log module(s) 1408 that may perform at least a portion of one or more of the method(s) 500, 1000, 1300 described above. It should be appreciated that computing system 1400 is only one example of a computing system, and that computing system 1400 may have more or fewer components than shown, may combine additional components not depicted in the example embodiment of FIG. 14, and/or computing system 1400 may have a different configuration or arrangement of the components depicted in FIG. 14. The various components shown in FIG. 14 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Geologic interpretations, models and/or other interpretation aids may be refined in an iterative fashion; this concept is applicable to embodiments of the present methods discussed herein. This can include use of feedback loops executed on an algorithmic basis, such as at a computing device (e.g., computing system 1400, FIG. 14), and/or through manual control by a user who may make determinations regarding whether a given step, action, template, model, or set of curves has become sufficiently accurate for the evaluation of the subterranean three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
receiving a first well log comprising a first signal and a second well log comprising a second signal;
identifying in the first signal a first change point that demarcates a first signal region and a second signal region;
determining that the first signal region of the first signal is inconsistent in comparison to the second signal region;
producing a derivative signal by calculating a derivative of at least a portion of the first signal;
identifying in the derivative signal a second change point that demarcates a third signal region and a fourth signal region;
determining that the third signal region of the derivative signal has a value that is substantially zero;
producing a modified first well log by removing the first signal region from the first signal in response to determining that the first signal region of the first signal is inconsistent in comparison to the second signal region, and by removing the third signal region from the first signal in response to determining that the third signal region of the derivative signal has the value that is substantially zero;
selecting a third change point in the modified first well log and a fourth change point in the second well log;
positioning a first window within the modified first well log based at least in part on the third change point;
positioning a second window at a first location within the second well log based at least in part on the fourth change point;
determining a first similarity value between the first signal in the first window and the second signal in the second window at the first location;
repositioning the second window at a second location within the second well log based at least in part on the fourth change point;
determining a second similarity value between the first signal in the first window and the second signal in the second window at the second location;
selecting the first location or the second location of the second window based at least partially upon the first and second similarity values; and
producing a modified second well log based at least partially upon the selected first location or second location of the second window.

2. The method of claim 1, wherein determining that the first signal region of the first signal is inconsistent in comparison to the second signal region comprises determining that a mean of the first signal region is less than a mean of the second signal region minus a product, wherein the product comprises a predetermined input multiplied by an empirical standard deviation of the second signal region.

3. The method of claim 1, wherein determining that the first signal region of the first signal is inconsistent in comparison to the second signal region comprises determining that a mean of the first signal region is greater than a mean of the second signal region plus a product, wherein the product comprises a predetermined input multiplied by an empirical standard deviation of the second signal region.

4. The method of claim 1, further comprising determining a modified fourth change point based at least partially upon the selected first location or second location of the second window, and wherein the modified second well log is produced based at least partially upon the modified fourth change point.

5. A method, comprising:
receiving a well log comprising a signal;
identifying in the signal a first change point that demarcates a first signal region and a second signal region;
determining that the first signal region is inconsistent in comparison to the second signal region;
producing a modified well log by removing the first signal region from the signal in response to determining that the first signal region is inconsistent in comparison to the second signal region;
producing a derivative signal by calculating a derivative of at least a portion of the signal;
identifying in the derivative signal a second change point that demarcates a third signal region and a fourth signal region;
determining that the third signal region of the derivative signal has a value that is substantially zero; and
adjusting the modified well log by removing the third signal region from the signal in response to determining that the third signal region of the derivative signal has the value that is substantially zero.

6. The method of claim 5, wherein determining that the first signal region is inconsistent in comparison to the second signal region comprises:
determining an upper bound and a lower bound based at least partially upon the second signal region; and
determining that a mean of the first signal region is not between the upper and lower bounds.

7. The method of claim 6, further comprising determining an empirical standard deviation of the second signal region, wherein the upper and lower bounds are based upon the empirical standard deviation of the second signal region.

8. The method of claim 5, wherein determining that the first signal region is inconsistent in comparison to the second signal region comprises comparing a mean of the first signal region to a mean of the second signal region in combination with a product, wherein the product comprises a predetermined input multiplied by an empirical standard deviation of the second signal region.

9. The method of claim 5, wherein determining that the first signal region is inconsistent in comparison to the second signal region comprises determining that a mean of the first signal region is less than a mean of the second signal region minus a product, wherein the product comprises a predetermined input multiplied by an empirical standard deviation of the second signal region.

10. The method of claim 5, wherein determining that the first signal region is inconsistent in comparison to the second signal region comprises determining that a mean of the first signal region is greater than a mean of the second signal region plus a product, wherein the product comprises a predetermined input multiplied by an empirical standard deviation of the second signal region.

11. The method of claim 5, wherein the first change point is identified in a predetermined portion of the signal using a change point detection algorithm, wherein the second change point is identified in a predetermined portion of the derivative signal using the change point detection algorithm, wherein the predetermined portion of the signal at least partially overlaps with the predetermined portion of the derivative signal, and wherein the change point detection algorithm is selected from the group consisting of a binary segmentation algorithm, a segment neighborhood algorithm, and a pruned exact linear time (PELT) algorithm.

12. The method of claim 5, wherein the second signal region represents a depth that at least partially overlaps with depths represented by the third signal region, the fourth signal region, or both.

13. The method of claim 5, further comprising removing the first signal region from the signal prior to producing the derivative signal such that the derivative signal does not include the first signal region.

14. The method of claim 5, further comprising removing the first signal region from the signal prior to determining the second change point such that the second change point is not located within the first signal region.

15. The method of claim 5, wherein the first change point, the first signal region, and the second signal region are in a first portion of the signal, wherein the second change point, the third signal region, and the fourth signal region are in a first portion of the derivative signal, the method further comprising:

identifying in a second portion of the signal a third change point that demarcates a fifth signal region and a sixth signal region;

determining that the sixth signal region of the signal is inconsistent in comparison to the fifth signal region; and adjusting the modified well log by removing the sixth signal region from the signal in response to determining that the sixth signal region of the signal is inconsistent in comparison to the fifth signal region.

16. The method of claim 15, further comprising:

identifying in a second portion of the derivative signal a fourth change point that demarcates a seventh signal region and an eighth signal region;

determining that the eighth signal region of the derivative signal has a value that is substantially zero; and adjusting the modified well log by removing the eighth signal region from the signal in response to determining that the eighth signal region of the derivative signal has the value that is substantially zero.

17. The method of claim 5, further comprising:

receiving a second well log comprising a second signal;

positioning a first window within the modified well log;

positioning a second window at a first location within the second well log;

determining a first similarity value between the signal in the first window and the second signal in the second window at the first location;

repositioning the second window at a second location within the second well log;

determining a second similarity value between the signal in the first window and the second signal in the second window at the second location;

selecting the first location or the second location of the second window based at least partially upon the first and second similarity values; and producing a modified second well log based at least partially upon the selected first location or second location of the second window.

18. A computing system comprising:

one or more processors; and a memory system comprising one or more non-transitory computer-readable media storing instructions that, when executed by at least one of the one or more processors, cause the computing system to perform operations, the operations comprising:

receiving a first well log comprising a first signal and a second well log comprising a second signal;

identifying in the first signal a first change point that demarcates a first signal region and a second signal region;

determining that the first signal region of the first signal is inconsistent in comparison to the second signal region;

producing a derivative signal by calculating a derivative of at least a portion of the first signal;

identifying in the derivative signal a second change point that demarcates a third signal region and a fourth signal region;

determining that the third signal region of the derivative signal has a value that is substantially zero;

producing a modified first well log by removing the first signal region from the first signal in response to determining that the first signal region of the first signal is inconsistent in comparison to the second signal region, and by removing the third signal region from the first signal in response to determining that the third signal region of the derivative signal has the value that is substantially zero;

selecting a third change point in the modified first well log and a fourth change point in the second well log;

positioning a first window within the modified first well log based at least in part on the third change point;

positioning a second window at a first location within the second well log based at least in part on the fourth change point;

determining a first similarity value between the first signal in the first window and the second signal in the second window at the first location;

repositioning the second window at a second location within the second well log based at least in part on the fourth change point;

determining a second similarity value between the first signal in the first window and the second signal in the second window at the second location;

selecting the first location or the second location of the second window based at least partially upon the first and second similarity values; and producing a modified second well log based at least partially upon the selected first location or second location of the second window.

19. A computing system comprising:

one or more processors; and a memory system comprising one or more non-transitory computer-readable media storing instructions that, when executed by at least one of the one or more processors, cause the computing system to perform operations, the operations comprising:

receiving a well log comprising a signal;

identifying in the signal a first change point that demarcates a first signal region and a second signal region;

determining that the first signal region is inconsistent in comparison to the second signal region;

producing a modified well log by removing the first signal region from the signal in response to determining that the first signal region is inconsistent in comparison to the second signal region;

producing a derivative signal by calculating a derivative of at least a portion of the signal;

identifying in the derivative signal a second change point that demarcates a third signal region and a fourth signal region;

determining that the third signal region of the derivative signal has a value that is substantially zero; and adjusting the modified well log by removing the third signal region from the signal in response to determining that the third signal region of the derivative signal has the value that is substantially zero.

\* \* \* \* \*